United States Patent
Sawaragi

(10) Patent No.: US 10,705,503 B2
(45) Date of Patent: Jul. 7, 2020

(54) CONTROL SYSTEM, AND CONTROL METHOD AND PROGRAM FOR CONTROL SYSTEM

(71) Applicant: OMRON Corporation, Kyoto-shi, Kyoto (JP)

(72) Inventor: Hiroshi Sawaragi, Otsu (JP)

(73) Assignee: OMRON Corporation, Kyoto-shi (JP)

( * ) Notice: Subject to any disclaimer, the term of this patent is extended or adjusted under 35 U.S.C. 154(b) by 204 days.

(21) Appl. No.: 15/794,194

(22) Filed: Oct. 26, 2017

(65) Prior Publication Data
US 2018/0120810 A1    May 3, 2018

(30) Foreign Application Priority Data
Oct. 31, 2016   (JP) ................. 2016-213860

(51) Int. Cl.
| | | |
|---|---|---|
| *G05B 19/402* | (2006.01) | |
| *G05B 23/02* | (2006.01) | |
| *G05B 19/401* | (2006.01) | |
| *G05B 19/414* | (2006.01) | |
| *G01B 11/00* | (2006.01) | |

(Continued)

(52) U.S. Cl.
CPC .......... *G05B 19/402* (2013.01); *G01B 11/005* (2013.01); *G01B 11/0608* (2013.01); *G01B 11/24* (2013.01); *G01B 21/045* (2013.01); *G05B 19/401* (2013.01); *G05B 19/4145* (2013.01); *G05B 23/0289* (2013.01); *G01B 2210/50* (2013.01); *G05B 2219/37193* (2013.01); *G05B 2219/37345* (2013.01)

(58) Field of Classification Search
CPC ................. G01B 21/045; G01B 11/005; G01B 11/0608; G01B 11/24; G05B 19/401; G05B 19/4145; G05B 19/402; G05B 23/0289
See application file for complete search history.

(56) References Cited

U.S. PATENT DOCUMENTS

| | | |
|---|---|---|
| 4,835,718 A | 5/1989 | Breyer et al. |
| 2005/0166413 A1 | 8/2005 | Crampton |

(Continued)

FOREIGN PATENT DOCUMENTS

| | | |
|---|---|---|
| CN | 1812868 A | 8/2006 |
| EP | 1602895 A1 | 12/2005 |

(Continued)

OTHER PUBLICATIONS

Extended European search report dated Mar. 2, 2018 in a counterpart European patent application.

(Continued)

*Primary Examiner* — Sujoy K Kundu
*Assistant Examiner* — L. Anderson
(74) *Attorney, Agent, or Firm* — Metroplex IP Law Group, PLLC

(57) ABSTRACT

A PLC system includes a displacement sensor, drives, and a PLC. When an unmeasurable condition is detected at a data obtaining position, the PLC system moves the displacement sensor back to the position at which the unmeasurable condition is detected, and again performs measurement. When an unmeasurable condition is detected again in the measurement, the PLC system SYS moves the stage to the next data obtaining position, and again performs measurement.

12 Claims, 15 Drawing Sheets

(51) Int. Cl.
*G01B 11/24* (2006.01)
*G01B 21/04* (2006.01)
*G01B 11/06* (2006.01)

(56) References Cited

U.S. PATENT DOCUMENTS

| | | |
|---|---|---|
| 2005/0263727 A1 | 12/2005 | Noda |
| 2008/0235970 A1 | 10/2008 | Crampton |
| 2013/0222815 A1 | 8/2013 | Patzwald |
| 2015/0254829 A1* | 9/2015 | Araki .................... G01B 11/24 |
| | | 382/141 |

FOREIGN PATENT DOCUMENTS

| | | |
|---|---|---|
| EP | 2230481 A2 | 9/2010 |
| JP | S61-124816 A | 6/1986 |
| JP | 2002-250619 A | 9/2002 |
| JP | 2012-177620 A | 9/2012 |

OTHER PUBLICATIONS

Office Action dated Dec. 19, 2019 in a related Chinese patent application.

* cited by examiner

CONTROL SYSTEM, AND CONTROL METHOD AND PROGRAM FOR CONTROL SYSTEM

CROSS REFERENCE TO RELATED APPLICATIONS

This application claims priority from prior Japanese Patent Application No. 2016-213860 filed with the Japan Patent Office on Oct. 31, 2016, the entire contents of which are incorporated herein by reference.

FIELD

The disclosure relates to a control system involving a control application for measuring the shape of an object, and a control method and a control program for the control system.

BACKGROUND

Machines and equipment used at many production sites are controlled by controllers such as programmable logic controllers (PLCs). A control system known in the art controls a measurement device using such a controller to measure the shape of an object. For example, Patent Literature 1 describes a control system for measuring the shape of an object using a contactless sensor, which is not placed into contact with the object.

CITATION LIST

Patent Literature

Patent Literature 1: Japanese Unexamined Patent Application Publication No. 2012-177620

SUMMARY

Technical Problem

However, the sensor may not appropriately obtain information for measuring the shape of an object having a rough surface or an extremely high part. In that case, the control system described in Patent Literature 1 may not accurately measure the shape of the object. The control system described in Patent Literature 1 thus has limitations on objects for which shape measurement is to be performed.

One or more aspects are directed to a control system with reduced limitations on objects for which shape measurement is to be performed, a control method and a program for the control system.

Solution to Problem

One aspect provides a control system including a measurement device that obtains one-dimensional information about an object, a drive that changes a relative position of the measurement device relative to the object, and a controller that controls the measurement device and the drive to obtain information about a two-dimensional shape or a three-dimensional shape of the object based on the one-dimensional information obtained by the measurement device. The controller includes a measurement data obtaining unit that performs a data obtaining process for obtaining the one-dimensional information from the measurement device and positional information from the drive as measurement data while changing the relative position, and a shape data generation unit that performs a data generation process for generating two-dimensional shape data or three-dimensional shape data based on the measurement data obtained by the measurement data obtaining unit. The measurement data obtaining unit performs the data obtaining process each time when the relative position changes to a data obtaining position that is in accordance with a defined measurement interval. When the data obtaining process fails, the measurement data obtaining unit changes the relative position back to the data obtaining position at which the data obtaining process has failed, and performs the data obtaining process again at the data obtaining position to which the relative position has been changed.

In some embodiments, when the data obtaining process fails, the measurement data obtaining unit retracts the measurement device to a position at which the measurement device is not in contact with the object.

In some embodiments, when the data obtaining process is performed again and fails, the measurement data obtaining unit changes the relative position to a next data obtaining position, and performs the data obtaining process at the next data obtaining position.

In some embodiments, the one-dimensional information corresponding to the data obtaining position at which the data obtaining process has failed differs from the one-dimensional information obtained as the measurement data.

In some embodiments, the controller counts the number of times the data obtaining process fails, and when the counted number reaches a predetermined number, the controller performs error processing.

In some embodiments, the control system further includes a feature quantity calculation unit that calculates a feature quantity of the object based on the shape data generated by the shape data generation unit.

In some embodiments, the controller functioning as a master device and the measurement device and the drive functioning as slave devices are connected through a network.

Another aspect provides a control method used by a controller for controlling a measurement device that obtains one-dimensional information about an object, and a drive that changes a relative position of the measurement device relative to the object to obtain information about a two-dimensional shape or a three-dimensional shape of the object based on the one-dimensional information obtained by the measurement device. The method includes performing a data obtaining process for obtaining the one-dimensional information from the measurement device and positional information from the drive as measurement data while changing the relative position, and performing a data generation process for generating two-dimensional shape data or three-dimensional shape data based on the measurement data. Performing the data obtaining process includes performing the data obtaining process each time when the relative position changes to a data obtaining position that is in accordance with a defined measurement interval. Performing the data obtaining process includes, when the data obtaining process fails, changing the relative position back to the data obtaining position at which the data obtaining process has failed, and performing the data obtaining process again at the data obtaining position to which the relative position has been changed.

Another aspect provides a program for a controller that controls a measurement device that obtains one-dimensional information about an object, and a drive that changes a relative position of the measurement device relative to the object to obtain information about a two-dimensional shape or a three-dimensional shape of the object based on the one-dimensional information obtained by the measurement device. The program causes a processor included in the controller to implement performing a data obtaining process for obtaining the one-dimensional information from the measurement device and positional information from the drive as measurement data while changing the relative position, and performing a data generation process for generating two-dimensional shape data or three-dimensional shape data based on the measurement data. Performing the data obtaining process includes performing the data obtaining process each time when the relative position changes to a data obtaining position that is in accordance with a defined measurement interval. Performing the data obtaining process includes, when the data obtaining process fails, changing the relative position back to the data obtaining position at which the data obtaining process has failed, and performing the data obtaining process again at the data obtaining position to which the relative position has been changed.

Advantageous Effects

The control system, the control method, and the program according to these aspects reduce limitations on objects for which shape measurement is to be performed.

DETAILED DESCRIPTION

Figure 1:
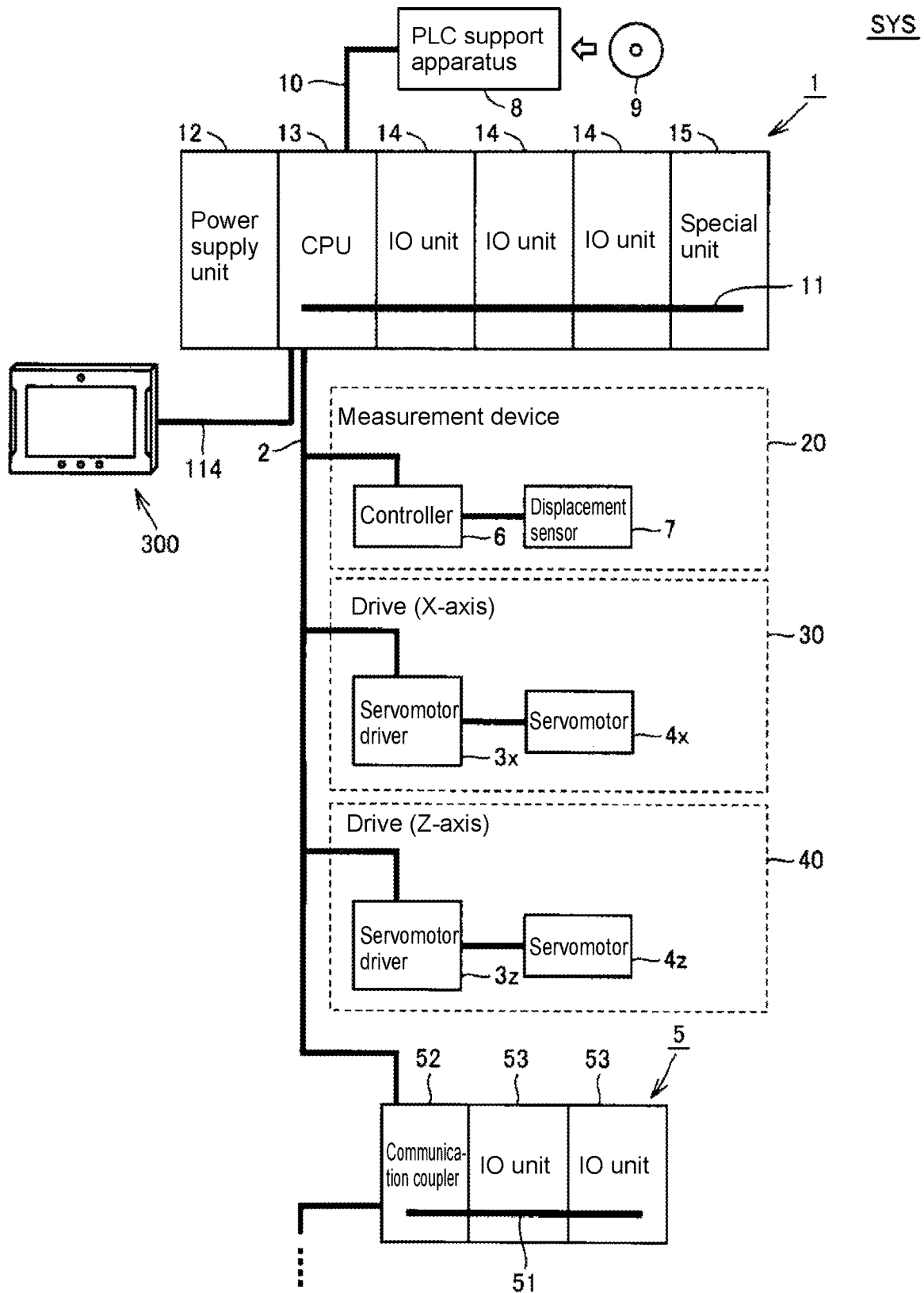
FIG. 1 is a schematic diagram illustrating a control system according to one or more embodiments.

Embodiments will now be described in detail with reference to the drawings. In the figures, the same reference numerals denote the same or corresponding parts.

A. Control System Configuration

A control system according to one or more embodiments has the control function of controlling a measurement device and a drive to obtain information about the two-dimensional (2D) or three-dimensional (3D) shape of an object. The configuration of a PLC system SYS, which is the control system according to one or more embodiments, will now be described with reference to FIG. 1.

FIG. 1 is a schematic diagram of the control system according to one or more embodiments. The PLC system SYS, which is the control system, includes a PLC 1, servomotor drivers 3x and 3z, a remote IO terminal 5, and a controller 6. The servomotor drivers 3x and 3z, the remote IO terminal 5, and the controller 6 are connected to the PLC 1 with a field network 2. The PLC 1 is also connected to a PLC support apparatus with, for example, a connection cable 10, and to a programmable display 300 with a network 114.

The controller 6 is connected to a displacement sensor 7 for obtaining one-dimensional (1D) information about an object (e.g., information including the height of the object and the distance to the object). The controller 6 and the displacement sensor 7 form a measurement device 20. The servomotor driver 3x drives a servomotor 4x for the X-axis. The servomotor driver 3x and the servomotor 4x form a drive 30 for the X-axis. The servomotor driver 3z drives a servomotor 4z for the Z-axis. The servomotor driver 3z and the servomotor 4z form a drive 40 for the Z-axis. The controller 6 and the displacement sensor 7 may be integrated into a single unit.

Figure 2:
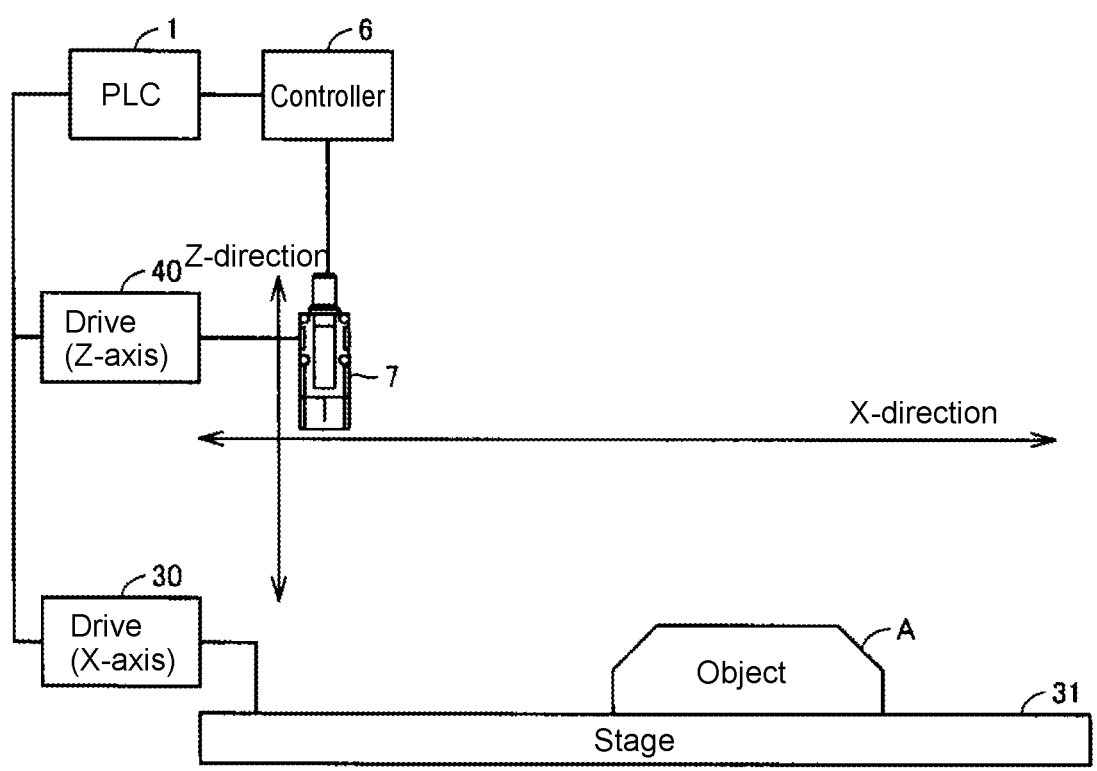
FIG. 2 is a schematic diagram illustrating measurement in a control system according to one or more embodiments.

The PLC system SYS, which has the control function for obtaining information about the 2D shape of an object, will now be described. The measurement performed in the PLC system SYS for obtaining the information about the 2D shape of an object will be described first. FIG. 2 is a schematic diagram describing the measurement in the control system according to one or more embodiments. In FIG. 2, the drive 30 is used for a stage 31 to move an object A placed on the stage 31 in X-direction in the figure, and the drive 40 is used for the displacement sensor 7 to move the displacement sensor 7 in Z-direction in the figure. The relative position of the measurement device 20 relative to the object A is changed by moving the stage 31 in X-direction using the drive 30 and moving the displacement sensor 7 in Z-direction using the drive 40.

The controller 6 is connected to the displacement sensor 7 to obtain measurement information from the displacement sensor 7. The measurement information obtained by the controller 6 is transmitted to the PLC 1 and processed in the PLC 1 as described later. The PLC 1 transmits position commands to the drives 30 and 40 to change the positions of the displacement sensor 7 and the stage 31.

Referring back to FIG. 1, the components will be described in more detail. The PLC 1 includes a CPU 13 responsible for main calculation, one or more IO units 14, and a special unit 15. These units transmit and receive data between them with a PLC system bus 11. These units are powered by a power supply unit 12 with an appropriate voltage. The units included in the PLC 1 are provided by its PLC manufacturer. The PLC system bus 11 is thus typically developed by and used independently by each individual PLC manufacturer. In contrast, the field network 2 may often follow open standards as described later to connect products developed by different manufacturers.

Figure 3:
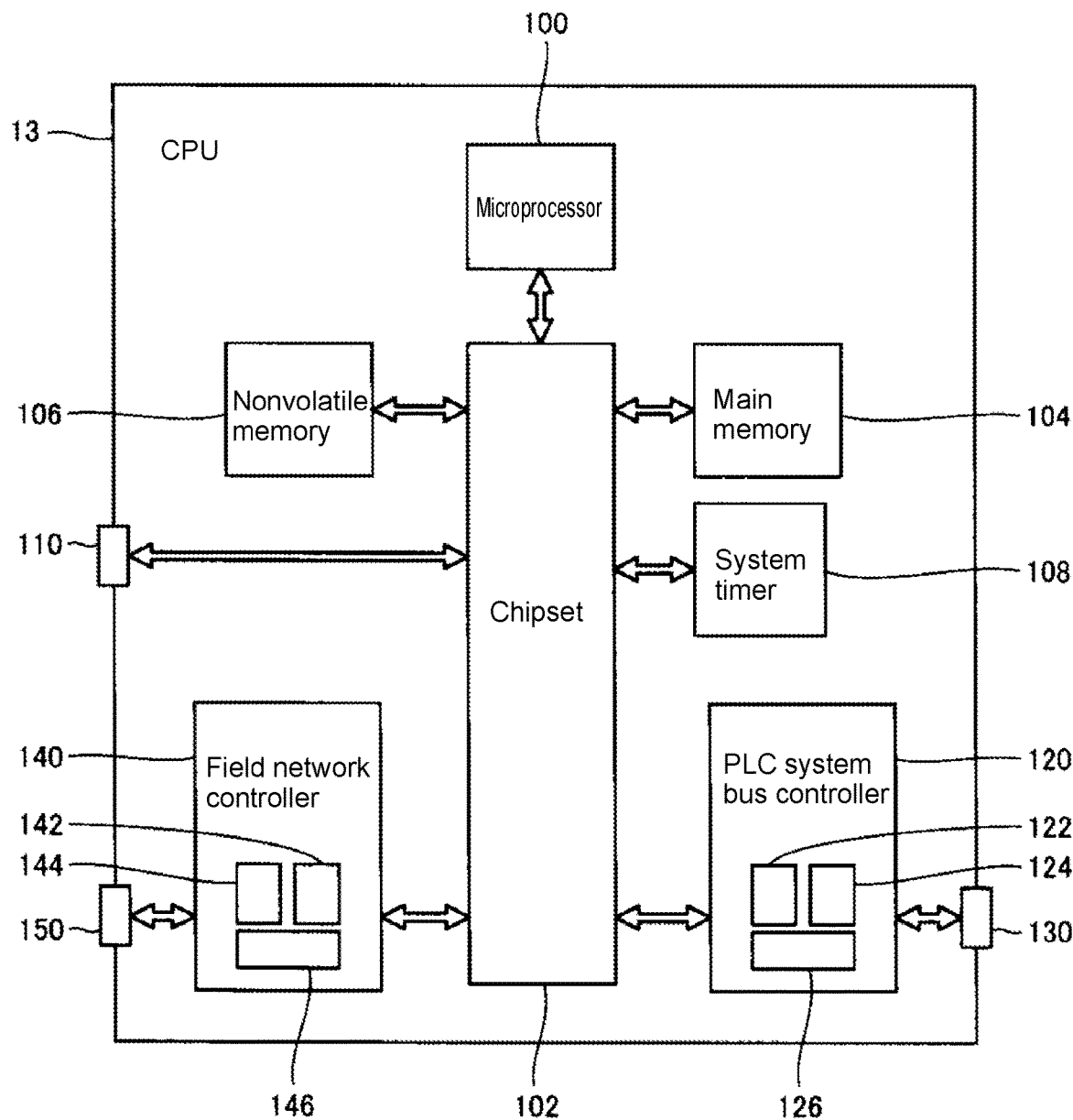
FIG. 3 is a schematic diagram illustrating the hardware configuration of a CPU according to one or more embodiments.

The CPU 13 will be described in detail later with reference to FIG. 3. The IO unit 14 performs typical input and output processing, and handles input and output of binary data indicating the on or off state. More specifically, the IO unit 14 collects information indicating that a sensor has detected any object (on state) or has detected no object (off state). The IO unit 14 also outputs, to a relay or an actuator, a command for activating (turning on) or a command for deactivating (turning off) the relay or the actuator.

The special unit 15 has the functions unsupported by the IO unit 14, such as input and output of analog data, temperature control, and communication under a specific communication scheme.

The field network 2 can carry various types of data transmitted to and received from the CPU 13. The field network 2 may be typically any industrial Ethernet (registered trademark) network. Examples of such industrial Ethernet (registered trademark) networks include EtherCAT (registered trademark), Profinet IRT, MECHATROLINK (registered trademark)-III, Powerlink, SERCOS (registered trademark)-III, and CIP Motion networks. A field network other than these industrial Ethernet (registered trademark) networks may also be used. For example, a field network without involving motion control may conform to DeviceNet or CompoNet/IP (registered trademark). The field network 2 included in the PLC system SYS according to one or more embodiments typically conforms to EtherCAT (registered trademark), which is industrial Ethernet (registered trademark).

Although the PLC system SYS shown in FIG. 1 includes both the PLC system bus 11 and the field network 2, the system may include one of the PLC system bus 11 and the field network 2. For example, the field network 2 may connect all the units. In some embodiments, the servomotor drivers 3x and 3z may be directly connected to the PLC system bus 11 without using the field network 2. In other embodiments, a communication unit for the field network 2 may be connected to the PLC system bus 11, and the communication unit may allow the CPU 13 to communicate with a device connected to the field network 2.

The servomotor drivers 3x and 3z are connected to the CPU 13 with the field network 2, and drive the servomotors 4x and 4z in accordance with command values received from the CPU 13. More specifically, the servomotor drivers 3x and 3z receive command values such as a position command, a speed command, and a torque command from the PLC 1 in fixed cycles. The servomotor drivers 3x and 3z also obtain measurement values associated with the operation of the servomotors 4x and 4z, including the values indicating a position, a speed (typically calculated based on the difference between the current position and the previous position), and a torque, from detectors such as position sensors (rotary encoders) and torque sensors that are connected to the shafts of the servomotors 4x and 4z. The servomotor drivers 3x and 3z then perform feedback control using target values set at the command values received from the CPU 13 and using the measurement values set as feedback values. More specifically, the servomotor drivers 3x and 3z adjust the electric current for driving the servomotors 4x and 4z to cause the measurement values to approach the target values. The servomotor drivers 3x and 3z may also be referred to as servomotor amplifiers.

Although FIG. 1 shows an example system including the servomotors 4x and 4z combined with the servomotor drivers 3x and 3z, the system may have another configuration including, for example, a pulse motor combined with a pulse motor driver.

The displacement sensor 7 obtains 1D information (e.g., height information) about the object A. The displacement sensor 7 may implement contactless measurement using a magnetic field, light, or sound waves, or contact measurement using a dial gauge or a differential transformer. The displacement sensor 7 that uses light may perform triangulation measurement, confocal measurement, or measurement based on other schemes. The displacement sensor 7 according to one or more embodiments described herein is a contactless white confocal displacement sensor.

The controller 6 converts the 1D information about the object A obtained by the displacement sensor 7 into digital information, and outputs the digital information to the CPU 13. For the displacement sensor 7 that is a contactless white confocal displacement sensor, the controller 6 includes a white light-emitting diode (LED), which is a white light source, a branch optical fiber, a spectrometer, an imaging device, and a control circuit (all not shown).

The stage 31 and the displacement sensor 7 are mounted on screw sliders. The sliders are moved by driving the servomotors 4x and 4z. These sliders may be any other sliders that have similar functions. For example, the stage 31 and the displacement sensor 7 may be mounted on linear sliders.

The field network 2 in the PLC system SYS shown in FIG. 1 is further connected to the remote IO terminal 5. The remote IO terminal 5 performs typical input and output processing substantially similarly to the IO unit 14. More specifically, the remote IO terminal 5 includes a communication coupler 52 responsible for processing associated with data transmission with the field network 2 and one or more IO units 53. These units transmit and receive data between them with a remote IO terminal bus 51.

In the PLC system SYS, the CPU 13 in the PLC 1 functions as a master device in the EtherCAT network, whereas the servomotor drivers 3x and 3z, the controller 6, and the communication coupler 52 function as slave devices in the EtherCAT network. The master device may not be the CPU 13 but may be an additional unit.

The PLC support apparatus 8 allows a user to create a project that includes a user program, system configuration information indicating the system configuration (device configuration), and a variable table. The PLC support apparatus 8 is typically implemented by a general-purpose computer. The hardware configuration of the PLC support apparatus 8 includes a CPU, a read-only memory (ROM), a random-access memory (RAM), a hard disk drive (HDD), a keyboard with a mouse, a display, and a communication interface (IF) (all not shown). Various programs to be executed by the PLC support apparatus 8 are stored in a compact disk read-only memory (CD-ROM) 9 and distributed. The programs may also be downloaded from an upper host computer through a network.

The programmable display 300 shows various items of information obtained from the PLC 1 on its screen. The user can operate the programmable display 300 to change the values of input variables stored in the PLC 1. The hardware configuration of the programmable display 300 includes a CPU, a ROM, a RAM, a flash ROM, a clock, operation keys, a camera, a touchscreen, and a communication interface.

B. Hardware Configuration of CPU

The hardware configuration of the CPU 13 will now be described with reference to FIG. 3. FIG. 3 is a schematic diagram showing the hardware configuration of the CPU according to one or more embodiments. In FIG. 3, the CPU 13 includes a microprocessor 100, a chipset 102, a main memory 104, a nonvolatile memory 106, a system timer 108, a PLC system bus controller 120, a field network controller 140, and a USB connector 110. The chipset 102 is coupled to the other components with various buses.

The microprocessor 100 and the chipset 102 are typically components defined in a general-purpose computer architecture. More specifically, the microprocessor 100 interprets and executes instruction codes sequentially fed from the chipset 102 in accordance with the internal clock. The chipset 102 transmits and receives internal data to and from the connected components, and generates an instruction code to be used by the microprocessor 100. The chipset 102 also caches the data resulting from calculation performed by the microprocessor 100.

The CPU 13 includes the main memory 104 and the nonvolatile memory 106 as storage.

The main memory 104, which is a volatile storage area (or RAM), stores various programs to be executed by the microprocessor 100 after the CPU 13 is powered on. The main memory 104 also serves as working memory to be used when the microprocessor 100 executes various programs. The main memory 104 may be a device such as a dynamic random access memory (DRAM) or a static random access memory (SRAM).

The nonvolatile memory 106 stores data including a real-time operating system (OS), a system program for the PLC 1, a user program, a motion calculation program, and system setting parameters in a nonvolatile manner. These programs and data are copied as appropriate to the main memory 104 to allow access from the microprocessor 100. The nonvolatile memory 106 may be semiconductor memory such as flash memory. In some embodiments, the nonvolatile memory 106 may be a magnetic recording medium, such as a hard disk drive, or an optical recording medium, such as a digital versatile disk random access memory (DVD-RAM).

The system timer 108 generates an interrupt signal in fixed cycles, and transmits the interrupt signal to the microprocessor 100. Although the hardware specification typically defines interrupt signals to be generated in multiple different cycles, the operating system (OS) or the basic input output system (BIOS) may cause interrupt signals to be generated in predetermined cycles. The interrupt signals generated by the system timer 108 are used to perform a control operation for each motion control cycle, which will be described later.

The CPU 13 includes the PLC system bus controller 120 and the field network controller 140 as communication circuits.

A buffer memory 126 functions as a transmission buffer for data output to another unit with the PLC system bus 11 (hereafter, output data) and as a reception buffer for data input from another unit with the PLC system bus 11 (hereafter, input data). The output data produced through calculation by the microprocessor 100 is initially stored into the main memory 104. The output data to be transferred to a particular unit is read from the main memory 104, and is temporarily stored in the buffer memory 126. The input data transferred from another unit is temporarily stored in the buffer memory 126, and is then transferred to the main memory 104.

A DMA control circuit 122 transfers output data from the main memory 104 to the buffer memory 126 and input data from the buffer memory 126 to the main memory 104.

A PLC system bus control circuit 124 transmits output data in the buffer memory 126 and receives input data to and from another unit connected to the PLC system bus 11. The PLC system bus control circuit 124 stores the received input data into the buffer memory 126. The PLC system bus control circuit 124 typically provides the functions of the physical layer and the data link layer in the PLC system bus 11.

The field network controller 140 controls data communication through the field network 2. More specifically, the field network controller 140 controls transmission of output data and reception of input data in accordance with the standards for the field network 2 that is used. As described above, the field network 2 in one or more embodiments conforms to the EtherCAT (registered trademark) standard, and thus includes the field network controller 140 with the hardware for normal Ethernet (registered trademark) communication. The EtherCAT (registered trademark) standard allows a common Ethernet (registered trademark) controller to implement a communication protocol following the normal Ethernet (registered trademark) standard. However, a specialized Ethernet (registered trademark) controller with a dedicated communication protocol different from normal communication protocols may be used depending on the type of industrial Ethernet (registered trademark) used for the field network 2. For a field network following a standard other than industrial Ethernet (registered trademark), a dedicated field network controller for this standard is used.

A DMA control circuit 142 transfers output data from the main memory 104 to a buffer memory 146 and input data from the buffer memory 146 to the main memory 104.

A field network control circuit 144 transmits output data in the buffer memory 146 and receives input data to and from another device connected to the field network 2. The field network control circuit 144 stores the received input data into the buffer memory 146. The field network control circuit 144 typically provides the functions of the physical layer and the data link layer in the field network 2.

The USB connector 110 is a connecting interface between the PLC support apparatus 8 and the CPU 13. Typically, a program transferred from the PLC support apparatus 8 and executable by the microprocessor 100 included in the CPU 13 is incorporated into the PLC 1 through the USB connector 110.

C. Software Configuration of CPU

A software set for providing various functions according to one or more embodiments will now be described with reference to FIG. 4. The software set includes an instruction code to be read as appropriate and executed by the microprocessor 100 included in the CPU 13.

Figure 4:
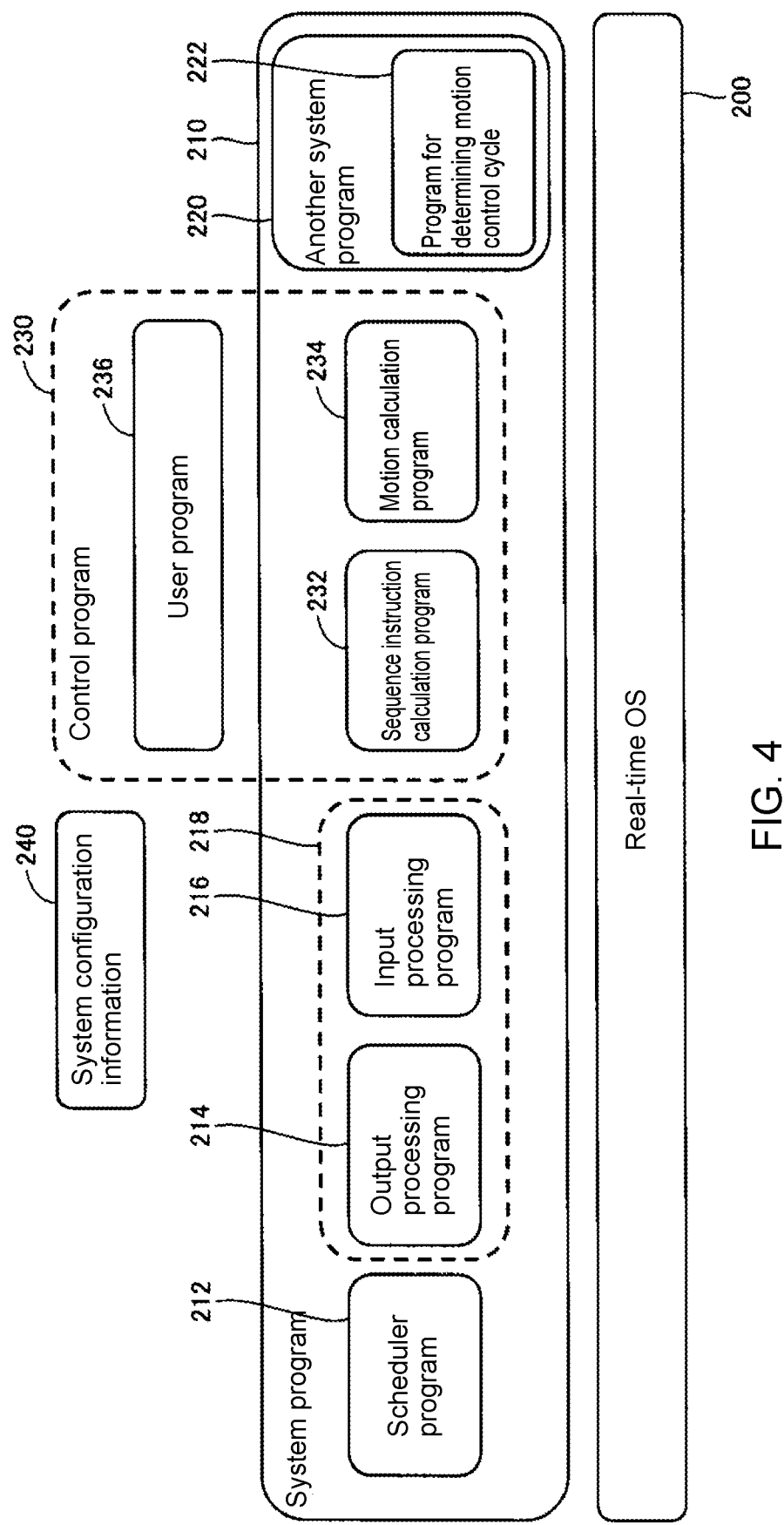
FIG. 4 is a schematic diagram illustrating the configuration of software executed in a CPU according to one or more embodiments.

FIG. 4 is a schematic diagram showing the configuration of software executed in the CPU according to one or more embodiments. In FIG. 4, the software executed in the CPU 13 has three layers: a real-time OS 200, a system program 210, and a user program 236.

The real-time OS 200 is designed with the computer architecture of the CPU 13, and provides a basic execution environment for the microprocessor 100 to execute the system program 210 and the user program 236. The real-time OS is typically provided by the PLC manufacturer or by a specialized software company.

The system program 210 is a software set for providing the functions of the PLC 1. More specifically, the system program 210 includes a scheduler program 212, an output processing program 214, an input processing program 216, a sequence instruction calculation program 232, a motion calculation program 234, and another system program 220. The output processing program 214 and the input processing program 216, which are typically executed sequentially (together), may also be collectively referred to as an IO processing program 218.

The user program 236 is generated in accordance with the control purpose of the user. More specifically, the program is designed freely depending on the line (process) to be controlled using the PLC system SYS.

The user program 236 achieves the control purpose of the user in cooperation with the sequence instruction calculation program 232 and the motion calculation program 234. More specifically, the user program 236 uses an instruction, a function, and a functional module provided by the sequence instruction calculation program 232 and the motion calculation program 234 to achieve a programmed operation. Thus, the user program 236, the sequence instruction calculation program 232, and the motion calculation program 234 may also be collectively referred to as a control program 230.

In this manner, the microprocessor 100 included in the CPU 13 executes the system program 210 and the user program 236 stored in the storage.

Each program will now be described in more detail.

As described above, the user program 236 is generated in accordance with the control purpose of the user (e.g., a target line or a target process). The user program 236 is typically in the format of an object program executable by the microprocessor 100 included in the CPU 13. The user program 236 is generated by, for example, the PLC support apparatus 8 compiling a source program written in a programming language, such as a ladder language. The generated user program 236 in the object program format is transferred from the PLC support apparatus 8 to the CPU 13 with the connection cable 10, and is stored into, for example, the nonvolatile memory 106.

The scheduler program 212 controls the processing start and the processing restart after interruption of the output processing program 214, the input processing program 216, and the control program 230 in each execution cycle. More specifically, the scheduler program 212 controls execution of the user program 236 and the motion calculation program 234.

In the CPU 13 according to one or more embodiments, a fixed execution cycle (motion control cycle) appropriate for the motion calculation program 234 is used as a common cycle for the entire processing. Completing the entire processing within one motion control cycle is thus difficult. Based on the priorities assigned to the processing to be executed, the entire processing is thus divided into processing tasks to be executed within each motion control cycle (including primary cyclic tasks) and processing tasks that may be executed across multiple motion control cycles (including cyclic tasks and event tasks). The scheduler program 212 manages, for example, the execution order of such processing tasks. More specifically, the scheduler program 212 executes the programs in descending order of the assigned priorities within each motion control cycle.

The output processing program 214 reprocesses the output data generated through execution of the user program 236 (control program 230) into a format appropriate for data transfer to the PLC system bus controller 120 and/or to the field network controller 140. The PLC system bus controller 120 or the field network controller 140 that performs data transmission in response to an instruction from the microprocessor 100 receives the instruction generated and output by the output processing program 214.

The input processing program 216 reprocesses the input data received by the PLC system bus controller 120 and/or the field network controller 140 into a format appropriate for use by the control program 230.

The sequence instruction calculation program 232 is called when a certain sequence instruction used in the user program 236 is executed. The sequence instruction calculation program 232 then enables the processing corresponding to the instruction. Examples of the sequence instruction calculation program 232 include a program for generating 2D shape data about the object A based on the measurement data obtained from the measurement device 20 and a program for calculating feature quantities such as the height and the cross-sectional area based on the generated shape data, as described later.

The motion calculation program 234 is executed in accordance with an instruction generated based on the user program 236. The motion calculation program 234 reads measurement information from the controller 6, and calculates a position command to be output to the servomotor drivers 3x and 3z.

The other system program 220 is a set of programs that enable various functions of the PLC 1 other than the programs individually shown in FIG. 4. The other system program 220 includes a program 222 for determining the motion control cycle.

The motion control cycle may be determined as appropriate in accordance with the control purpose. Typically, the user enters information indicating the motion control cycle into the PLC support apparatus 8. The entered information is then transferred from the PLC support apparatus 8 to the CPU 13. The program 222 for determining the motion control cycle stores the information transmitted from the PLC support apparatus 8 into the nonvolatile memory 106, and sets the system timer 108 so that an interrupt signal is generated in motion control cycles specified by the system timer 108. When the CPU 13 is powered on, the program 222 for determining the motion control cycle is executed. This causes information indicating the motion control cycle to be read from the nonvolatile memory 106. The system timer 108 is then set in accordance with the read information.

The format of the information indicating the motion control cycle may be, for example, the time value indicating the motion control cycle, or information (a number or a character) specifying one of predetermined multiple choices about the motion control cycle.

The CPU 13 according to one or more embodiments includes a device for determining the motion control cycle corresponding to an element used to freely determine the motion control cycle, such as a communication unit that communicates with the PLC support apparatus 8 and to obtain information indicating the motion control cycle, the program 222 for determining the motion control cycle, and the system timer 108 that freely determines the generation cycle of the interrupt for determining the motion control cycle.

The real-time OS 200 provides an environment in which multiple programs are switched over time and executed. The PLC 1 according to one or more embodiments initially sets an output preparation interrupt (P) and a field network transmission interrupt (X) as an event (interrupt) for outputting (transmitting), to another unit or another device, output data generated by the CPU 13 executing a program. In response to the output preparation interrupt (P) or the field network transmission interrupt (X), the real-time OS 200 switches a target executed by the microprocessor 100 from the program that is currently being executed when the interrupt is generated to the scheduler program 212. When neither the scheduler program 212 nor any program for which execution is controlled by the scheduler program 212 is being executed, the real-time OS 200 executes another program included in the system program 210. Examples of such other programs include a program associated with the communication processing performed between the CPU 13 and the PLC support apparatus 8 using the connection (USB) cable 10.

D. Functional Configuration of Control System

Figure 5:
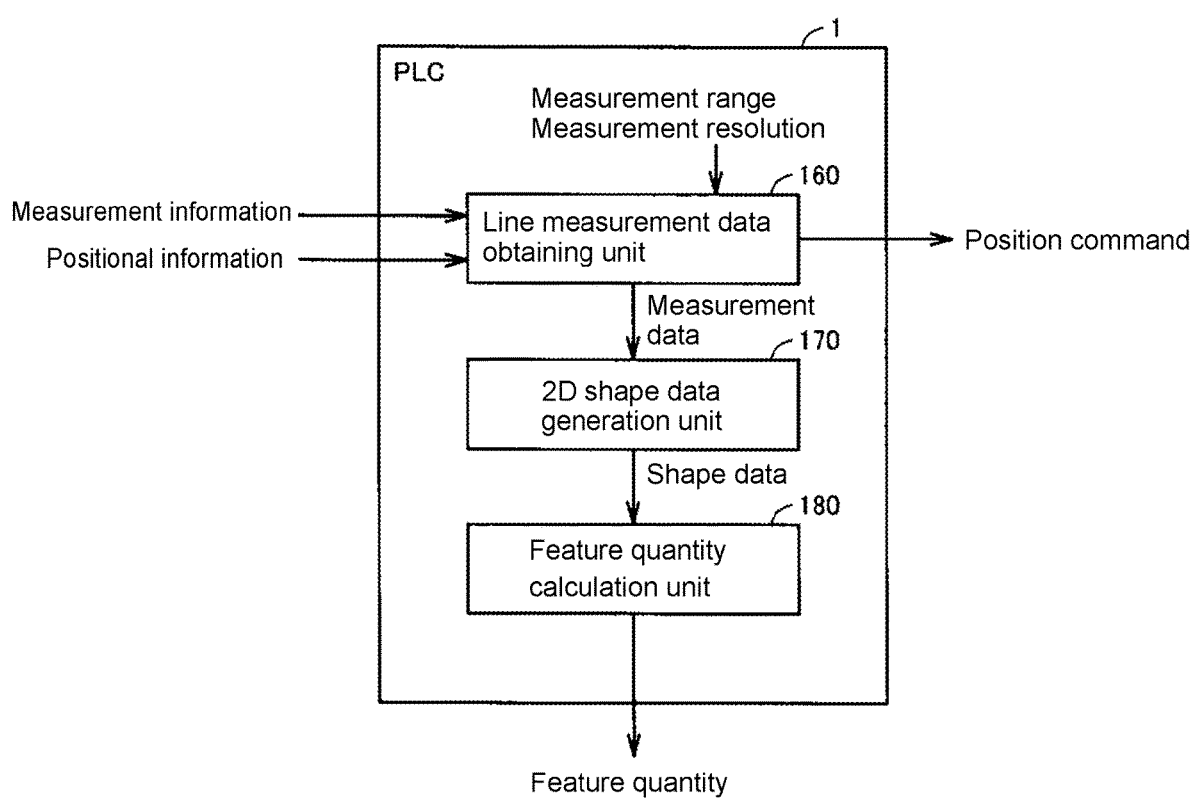
FIG. 5 is a functional block diagram illustrating a control system according to one or more embodiments.

The PLC system SYS then enables the function of obtaining the information about the 2D shape of the object A using the PLC 1 executing the sequence instruction calculation program 232 and the motion calculation program 234. The functional components of the PLC system SYS as the control system will now be described in detail with reference to the drawing. FIG. 5 is a functional block diagram of the control system according to one or more embodiments. To achieve the control function for obtaining information about the 2D shape of an object, the PLC system SYS includes the PLC 1 including a line measurement data obtaining unit 160 and a 2D shape data generation unit 170. The PLC 1 shown in FIG. 5 also includes a feature quantity calculation unit 180, which calculates a feature quantity from the shape data generated by the 2D shape data generation unit 170.

The line measurement data obtaining unit 160 first measures the height of the object A (1D information) while changing the relative position of the displacement sensor 7 relative to the object A, and obtains the measurement result as measurement data. More specifically, the line measurement data obtaining unit 160 outputs command values including a position command to the drives 30 and 40 based on a predetermined measurement range and a predetermined measurement resolution to obtain the measurement data. When the drives 30 and 40 are controlled in accordance with the command values, the line measurement data obtaining unit 160 obtains, for each of the measurement recording positions determined by the measurement resolution, the measurement information from the displacement sensor 7 and the positional information from the drives 30 and 40 as measurement data. The measurement range is from the measurement start position to the measurement end position. The measurement resolution is a measurement interval in X-direction during the measurement.

The drives 30 and 40 are controlled to measure the shape of the object A through either surface search control or trace control. The surface search control causes the displacement sensor 7 to measure the height of the object A within a measurement range by scanning using the height of the displacement sensor 7 maintained within the measurement range. When the height of the object A changes out of the measurement range of the displacement sensor 7 in the surface search control, the height of the displacement sensor 7 is readjusted before measurement to maintain the displacement sensor 7 within the measurement range. The trace control sequentially changes the height of the displacement sensor 7 during the measurement to cause the displacement sensor 7 and the object A to have a constant distance between them.

The 2D shape data generation unit 170 then generates the shape data indicating the 2D shape of the object A based on the measurement data obtained by the line measurement data obtaining unit 160. The measurement data obtained by the line measurement data obtaining unit 160 includes the height of the object A at a position in X-direction within the measurement range. The 2D shape data generation unit 170 performs processing including shape correction of the measurement data based on the inclination of the displacement sensor 7 or its misalignment to generate shape data.

The feature quantity calculation unit 180 then calculates the feature quantities of the object A (e.g., the height and the cross-sectional area) based on the shape data generated by the 2D shape data generation unit 170. The feature quantity calculation unit 180 selects a feature quantity of the object A, for which calculation is to be performed, by allowing the user to select the sequence instruction calculation program 232 included in the user program 236.

E. Control Process Performed by Control System

Figure 6:
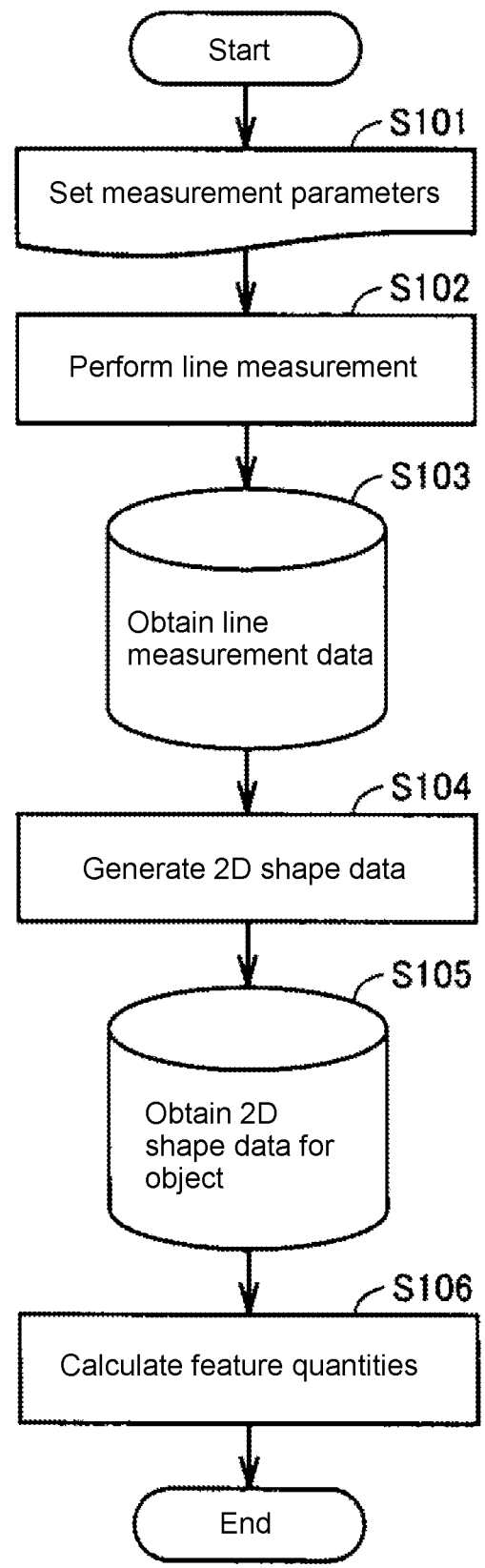
FIG. 6 is a flowchart illustrating a control process performed by a control system according to one or more embodiments.
Figure 7:
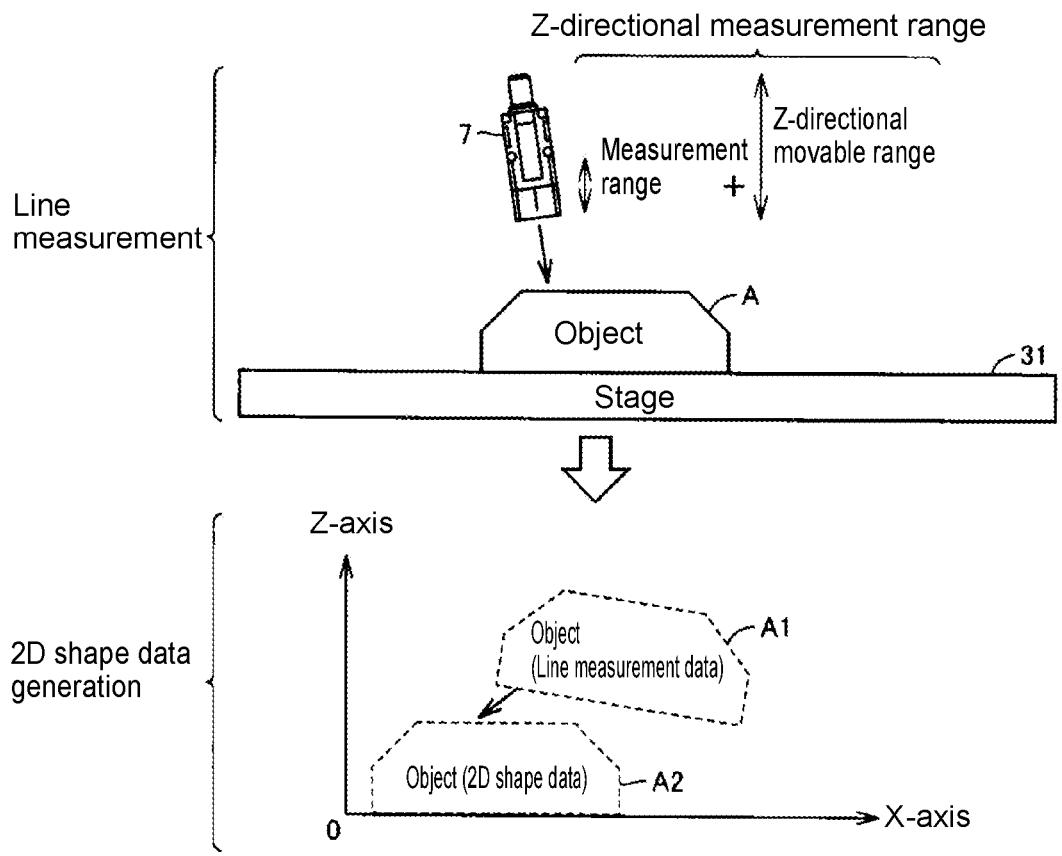
FIG. 7 is a schematic diagram illustrating line measurement and 2D shape data generation performed in a control system according to one or more embodiments.

The functions of the control system according to one or more embodiments shown in FIG. 5 will now be described as a control process performed by the control system. FIG. 6 is a flowchart showing the control process performed by the control system according to one or more embodiments. FIG. 7 is a schematic diagram showing the line measurement and the 2D shape data generation performed in the control system according to one or more embodiments.

When the PLC system SYS starts measurement for obtaining the information about the 2D shape of the object A, the PLC 1 sets measurement parameters (step S101). More specifically, the PLC 1 displays, on the programmable display 300, a prompt for the user to enter the parameters for the measurement start position and the measurement end position, which define the measurement range, and for the measurement resolution. After the user enters the parameters based on the prompt, the PLC 1 stores these parameters. For example, the user sets, as the measurement parameters, the measurement start position at a distance of 10 cm from the reference position (X=0) on the stage 31, the measurement end position at a distance of 30 cm from the reference position on the stage 31, and the measurement resolution of 10 μm. More specifically, the set measurement resolution enables measurement at 20,000 measurement recording positions in the measurement range (measurement breadth) of 20 cm.

Figure 8:
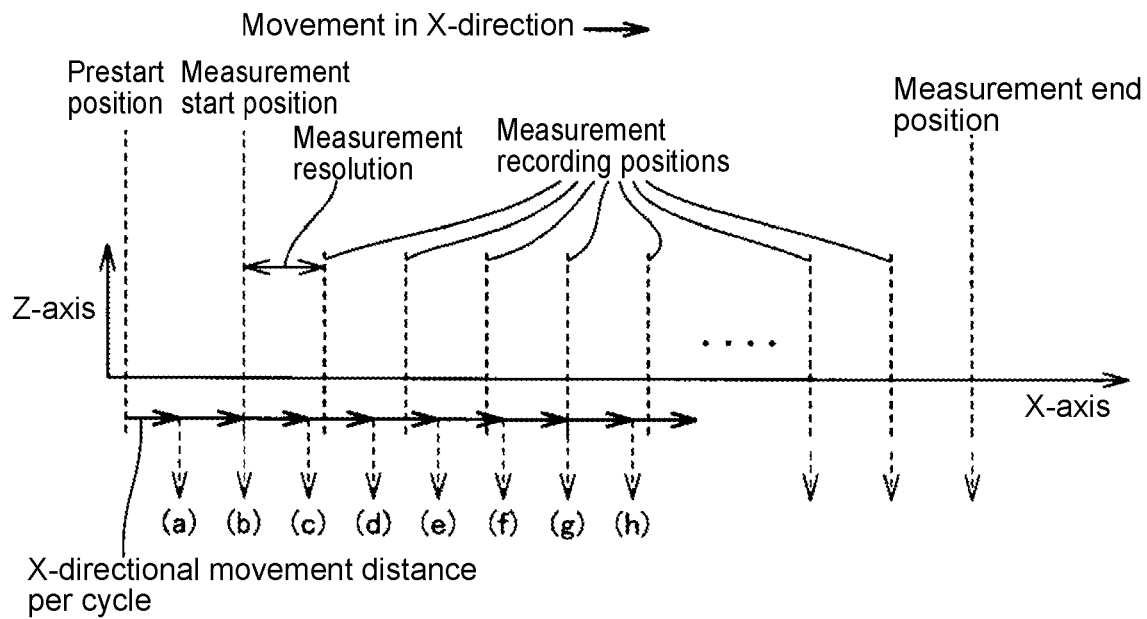
FIG. 8 is a diagram illustrating a measurement resolution used in a control system according to one or more embodiments.

The relationship between the measurement resolution and the measurement recording positions will now be described in more detail. FIG. 8 is a diagram describing the measurement resolution used in the control system according to one or more embodiments. In FIG. 8, the horizontal axis is X-axis, and the vertical axis is Z-axis. FIG. 8 shows the measurement recording positions from a prestart position (X=0) to the measurement end position. The measurement recording positions are determined by dividing the measurement range (range from the measurement start position to the measurement end position) by the measurement resolution. When the X-position of the displacement sensor 7 either reaches or exceeds a measurement recording position, the PLC 1 reads the measurement information (the information about the height of the object A) from the displacement sensor 7 and the positional information (the X-directional position or the X coordinate, and the Z-directional position or the Z coordinate) from the drives 30 and 40 at this position.

More specifically, (a) when the X-position of the displacement sensor 7 does not reach the measurement start position, the PLC 1 does not read the measurement information from the displacement sensor 7 or the positional information from the drives 30 and 40 at this position. When the stage 31 is moved, and (b) the X-position of the displacement sensor 7 reaches the measurement start position, the PLC 1 reads the measurement information from the displacement sensor 7 and the positional information from the drives 30 and 40 at this position. When the stage 31 is moved, and (c) the X-position of the displacement sensor 7 does not reach the first measurement recording position from the measurement start position, the PLC 1 does not read the measurement information from the displacement sensor 7 or the positional information from the drives 30 and 40 at this position. When the stage 31 is moved, and (d) the X-position of the displacement sensor 7 either reaches or exceeds the first measurement recording position from the measurement start position and does not reach the second measurement recording position, the PLC 1 reads the measurement information from the displacement sensor 7 and the positional information from the drives 30 and 40 at this position. Similarly, each time when the stage 31 is moved until the X-position of the displacement sensor 7 either reaches or exceeds one of the second and subsequent measurement recording positions from the measurement start position, the PLC 1 reads the measurement information from the displacement sensor 7 and the positional information from the drives 30 and 40 at this position. Each position at which measurement information is read from the displacement sensor 7 and positional information is read from the drives 30 and 40 is also referred to as a data obtaining position. Reading the measurement information from the displacement sensor 7 and the positional information from the drives 30 and 40 is also referred to as a data obtaining process. In the example shown in FIG. 8, the data obtaining positions correspond to the positions indicated by (b), (d), and other bracketed letters. More specifically, measurement information from the displacement sensor 7 and positional information from the drives 30 and 40 are obtained by reading measurement information from the displacement sensor 7 and reading positional information from the drives 30 and 40 each time when the X-position of the displacement sensor 7 reaches a data obtaining position. The data obtaining positions thus correspond to the measurement recording positions.

The PLC 1 changes the X-position of the displacement sensor 7 by moving the stage 31 in X-direction using the drive 30. When an X-directional positional change (movement distance) per cyclic task is equal to an interval (including an integer multiple of the interval) between measurement recording positions, any deviation as shown in FIG. 8 will not occur between a measurement recording position and an information read position. An X-directional positional change (movement distance) per cyclic task is calculated by multiplying the X-directional speed by the task cycle. However, for an X-directional positional change (movement distance) per cyclic task that is not equal to an interval (including an integer multiple of the interval) between measurement recording positions, no information is read at some measurement recording positions when the stage 31 is moved in the manner described above. When the stage 31 is moved fast and the X-directional positional change (movement distance) per cyclic task exceeds the measurement resolution, no information can be read at some measurement recording positions. For a measurement resolution of 10 μm and a task cycle of 1 ms, the PLC 1 may move the stage 31 at a speed of 10 mm/s or lower.

Referring back to FIG. 6, the PLC 1 performs line measurement (step S102). The PLC 1 reads measurement information obtained by the displacement sensor 7 from the controller 6 at measurement recording positions while controlling the drive 30 to change the position of the stage 31 in X-direction within the measurement range defined in step S101. As shown in FIG. 7, the displacement sensor 7 during the line measurement measures the height of the object A while passing over the object A in X-direction. The displacement sensor 7, which is a contactless white confocal displacement sensor, has a measurement range of about 2 mm in the height direction. More specifically, with the position of the displacement sensor 7 fixed relative to the stage 31, the displacement sensor 7 can measure the object A with a height of up to 2 mm from the stage 31.

The PLC 1 changes the position of the displacement sensor 7 using the drive 40 to enable measurement of the height of the object A beyond the measurement range of the displacement sensor 7 (about 2 mm). With the drive 40 that can change the position of the displacement sensor 7 by up to about 20 mm (Z-directional movable range), the PLC 1 can measure the height of the object A within a range (Z-directional measurement range) defined by the sum of the measurement range of the displacement sensor 7 (about 2 mm) and the Z-directional movable range (about 20 mm). In other words, the PLC 1 can measure the height of the object A within a range of up to 22 mm in Z-direction.

Referring back to FIG. 6, the PLC 1 obtains line measurement data (step S103) including multiple pieces of measurement information (information about the height of the object A) received from the displacement sensor 7 and multiple pieces of positional information (X-coordinate information and Z-coordinate information) received from the drives 30 and 40, which are obtained at measurement recording positions while the PLC 1 is changing the position of the displacement sensor 7 within the measurement range.

The PLC 1 then generates 2D shape data based on the line measurement data obtained in step S103 (step S104). The 2D shape data is obtained by converting the line measurement data through shape correction (for the inclination, X-direction, and Z-direction). For the displacement sensor 7 inclined as shown in FIG. 7, the line measurement data A1 obtained in step S103 involves the inclination. Additionally, the line measurement data A1 may also involve an X-directional deviation depending on the position of the stage 31, and further a Z-directional deviation depending on the position of the displacement sensor 7. Such deviations are corrected to X=0 and Z=0 at the reference position defined on the stage 31. As shown in FIG. 7, the PLC 1 corrects the line measurement data A1 to generate 2D shape data A2 based on corrected parameters. The 2D shape data A2 is the data that has undergone shape correction (for the inclination, X-direction, and Z-direction).

The PLC 1 further performs interval equalization of the sequence of data points on the line measurement data obtained in step S103. As shown in FIG. 8, the stage 31 moves by an X-directional positional change (movement distance) per cyclic task that is smaller than the interval between measurement recording positions. The line measurement data thus involves a difference between a position at which the measurement information is read from the displacement sensor 7 and a measurement recording position. More specifically, no measurement is performed at the first measurement recording position in FIG. 8, and information is read at the position (d). As a result, the PLC 1 obtains the line measurement data with the X and Z coordinates deviated by the distance from the first measurement recording position to the position (d) in X-direction. The PLC 1 performs interval equalization of the sequence of data points to convert the line measurement data obtained in step S103 into 2D shape data generated at each measurement recording position.

Figure 9:
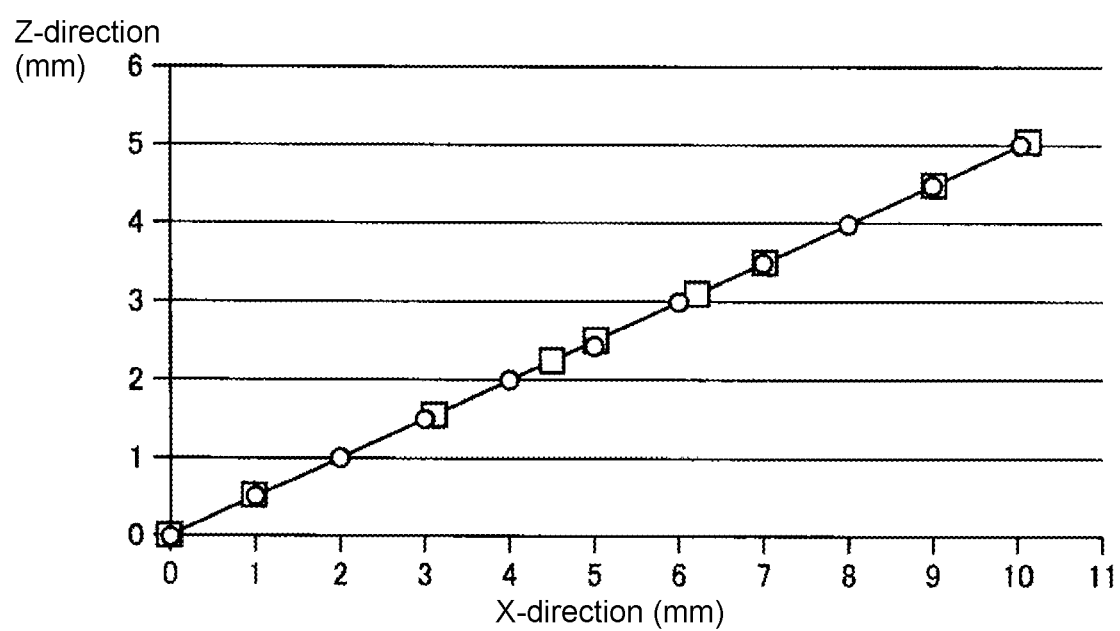
FIG. 9 is a graph illustrating interval equalization for 2D shape data in a control system according to one or more embodiments.

FIG. 9 is a graph showing interval equalization for 2D shape data in the control system according to one or more embodiments. In FIG. 9, the horizontal axis is X-axis, and the vertical axis is Z-axis. FIG. 9 shows measurement information from the displacement sensor 7 (height information about the object A) obtained at distances ranging from 0 mm to 10 mm in X-direction. In this graph with the measurement recording positions of 1-mm intervals, the actually obtained line measurement data indicated by square measurement points deviates from the measurement recording positions. The PLC 1 performs interval equalization of the sequence of data points to correct the square measurement points to the circle measurement points through interval equalization before generating 2D shape data. The square measurement points are corrected to these interval-equalized circle measurement points by estimating the values of the interval-equalized measurement points through interpolation such as linear interpolation or spline interpolation. For the 2D shape data generated from the interval-equalized sequence of data points, the measurement recording positions (X-direction positions, or X coordinates) may not be recorded. This 2D shape data is recorded as the measurement information from the displacement sensor 7 (information about the height of the object A). The PLC 1 thus reduces the volume of 2D shape data.

Referring back to FIG. 6, the PLC 1 obtains the 2D shape data (step S105) that has undergone the shape correction and the interval equalization of the sequence of data points in step S104. The PLC 1 in step S104 may also perform other processing such as filtering, in addition to the shape correction and the interval equalization of the sequence of data points. Examples of filtering include smoothing and median filtering. When line measurement data is unstable because of the shape or the surface state of the object A, such processing can reduce noise in the line measurement data. Smoothing includes calculating the moving average the specified number of times at each position in X-direction. Median filtering includes defining an area with an X-direction position as the center and replacing a Z-directional value at the position with the median of Z-directional values within the defined area.

Referring back to FIG. 6, the feature quantity calculation unit 180 in the PLC 1 calculates feature quantities (e.g., the height and the cross-sectional area) (step S106) using the 2D shape data obtained in step S105, and ends the control process.

F. Feature Quantity Calculation

The feature quantity calculation performed by the feature quantity calculation unit 180 will now be described in more detail. FIGS. 10A to 11C are diagrams describing the feature quantity calculation in the control system according to one or more embodiments.

F1. Height Calculation

Figure 10A:
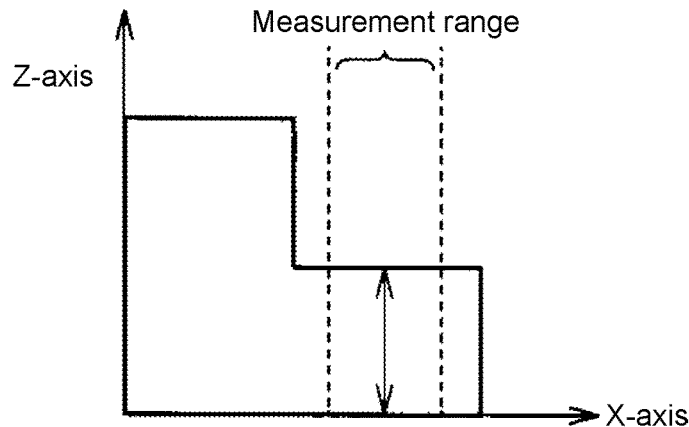
FIGS. 10A to 10C are diagrams illustrating feature quantity calculation in a control system according to one or more embodiments.

In FIG. 10A, the feature quantity calculation unit 180 calculates the height within a defined measurement range using the 2D shape data generated by the 2D shape data generation unit 170. More specifically, the feature quantity calculation unit 180 calculates information about the height of the object A within the measurement range defined by the user from the 2D shape data. The defined measurement range includes at least one piece of shape data. The feature quantity calculation unit 180 can also calculate, for example, the average height in the measurement range, the maximum height in the measurement range (including the X coordinate at that height), and the minimum height in the measurement range (including the X coordinate at that height). For example, the feature quantity calculation unit 180 can inspect the lens top and the screwed condition or measure the level difference in a case edge by calculating the height of an object based on its 2D shape data.

F2. Edge Calculation

Figure 10B:
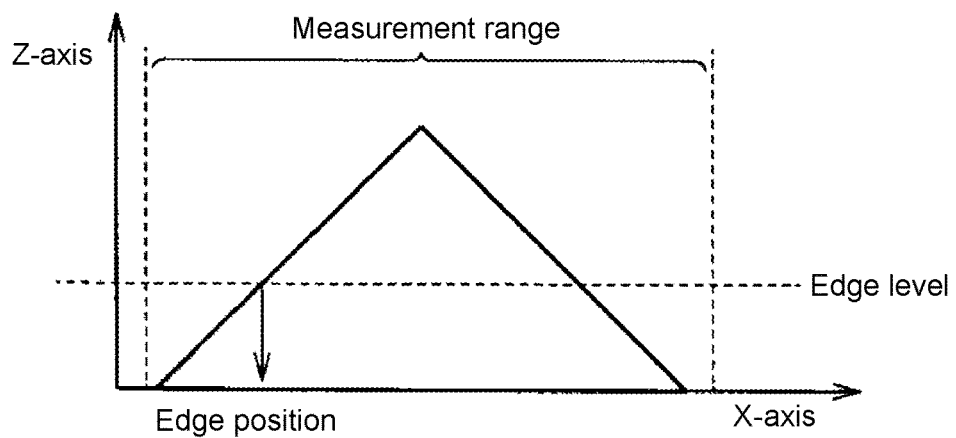

In FIG. 10B, the feature quantity calculation unit 180 calculates the X coordinate at which the height of the object A exceeds a predetermined edge level within a defined measurement range using the 2D shape data generated by the 2D shape data generation unit 170. More specifically, the feature quantity calculation unit 180 calculates, from the 2D shape data, information about the edge position, at which the height of the object A is equal to the edge level within the measurement range defined by the user. The feature quantity calculation unit 180 determines, for example, the edge type being the direction in which the edge level exceeds (rises or falls), the measurement direction depending on either the lower limit or the upper limit within the measurement range is to be measured first, or determines the number of edge excess times depending on the number of times the edge level exceeds before detecting the current excess. For example, the feature quantity calculation unit 180 can detect a battery end or a module end and inspect the battery position or the module position through edge calculation using the 2D shape data. The feature quantity calculation unit 180 can also detect a case end and inspect the case width through edge calculation using the 2D shape data.

F3. Inflection Point Calculation

Figure 10C:
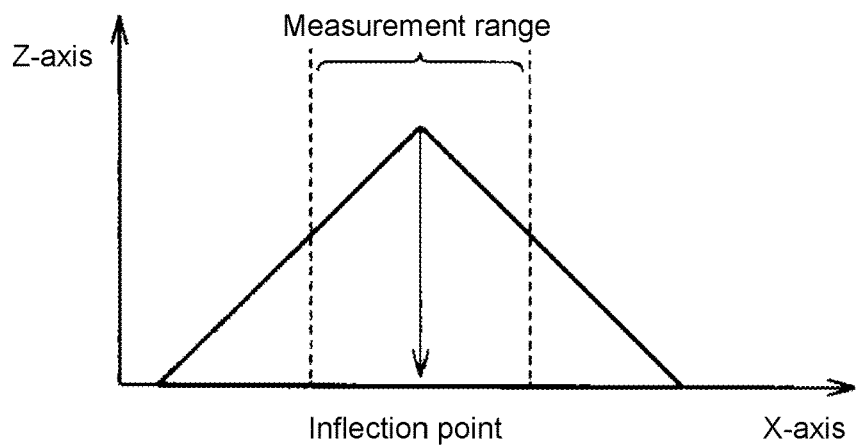

In FIG. 10C, the feature quantity calculation unit 180 calculates an inflection point within a defined measurement range using the 2D shape data generated by the 2D shape data generation unit 170. More specifically, the feature quantity calculation unit 180 calculates the X coordinate of a bend position of the shape data line (inflection point) within the measurement range defined in the 2D shape data. For multiple inflection points within the measurement range, the feature quantity calculation unit 180 calculates the X coordinate of the inflection point that has the highest degree of bend (sensitivity). The feature quantity calculation unit 180 compares the bend degrees (sensitivities) using their absolute values. When multiple inflection points have the same sensitivity, the feature quantity calculation unit 180 outputs the inflection point that has the smallest X coordinate. For example, the feature quantity calculation unit 180 can inspect a crystal angular position through inflection point calculation using the 2D shape data.

F4. Calculating Angle from Horizontal Plane

Figure 11A:
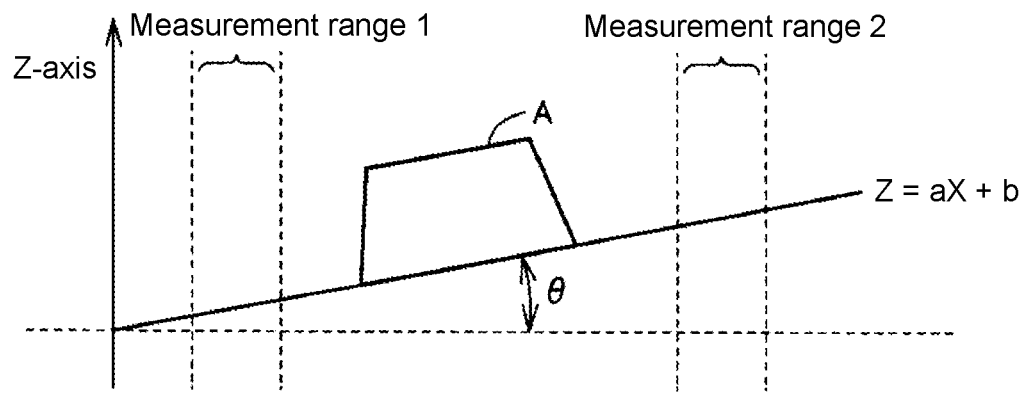
FIGS. 11A to 11C are diagrams illustrating feature quantity calculation in a control system according to one or more embodiments.

In FIG. 11A, the feature quantity calculation unit 180 calculates the angle θ of the object A from the horizontal plane using the 2D shape data generated by the 2D shape data generation unit 170. More specifically, the feature quantity calculation unit 180 draws a straight line connecting the heights of the 2D shape data in two measurement ranges (a measurement range 1 and a measurement range 2), and calculates the angle θ formed between the straight line and the horizontal plane. With the horizontal axis being the X-axis and the vertical axis being the Z-axis, the feature quantity calculation unit 180 may also output the slope a of the line of the object A, and the intercept as b. For example, the feature quantity calculation unit 180 can inspect a gap between glass planes and a crystal inclination by calculating an angle from the horizontal plane using the 2D shape data.

F5. Calculating Cross-Sectional Area

Figure 11B:
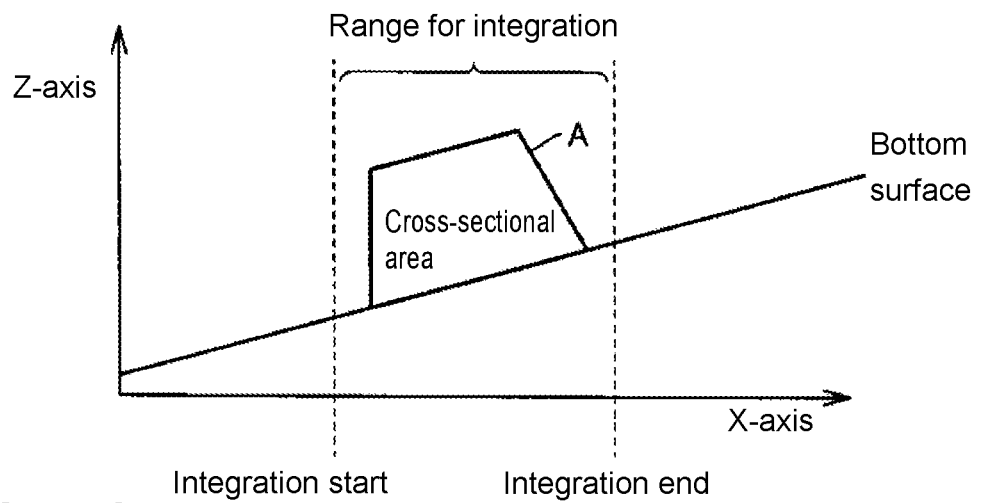

In FIG. 11B, the feature quantity calculation unit 180 calculates the cross-sectional area of the object A using the 2D shape data generated by the 2D shape data generation unit 170. More specifically, the feature quantity calculation unit 180 determines the bottom surface of the object A from the 2D shape data in a defined range for integration, and calculates the surface area of a portion defined by the bottom surface and the waveform of the 2D shape data. For example, the feature quantity calculation unit 180 can inspect a seal shape by calculating its cross-sectional area using the 2D shape data.

F6. Comparison Operation

Figure 11C:
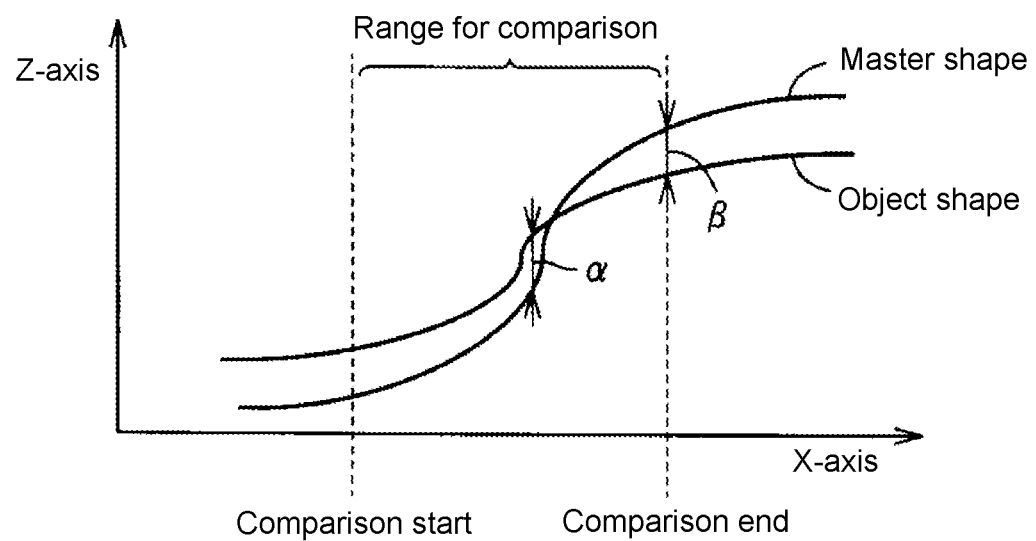

In FIG. 11C, the feature quantity calculation unit 180 compares the master shape and the shape of the object A using the 2D shape data generated by the 2D shape data generation unit 170. More specifically, the feature quantity calculation unit 180 compares the 2D shape data about the master with the 2D shape data about the object within a defined measurement range to calculate their difference in the height (Z-direction). The feature quantity calculation unit 180 obtains a negative difference α when the shape of the object A is smaller than the shape of the master (or the height of the object A is smaller at the same X-directional position). The feature quantity calculation unit 180 obtains a positive difference β when the shape of the object A is larger than the shape of the master (or the height of the object A is greater at the same X-directional position). The feature quantity calculation unit 180 may have a tolerance for such differences. When the difference resulting from the comparison falls within the tolerance, the shapes are determined to be the same. For example, the feature quantity calculation unit 180 can inspect the height of a module including multiple components through comparison and calculation using the 2D shape data.

G. Types of Control

Figure 12A:
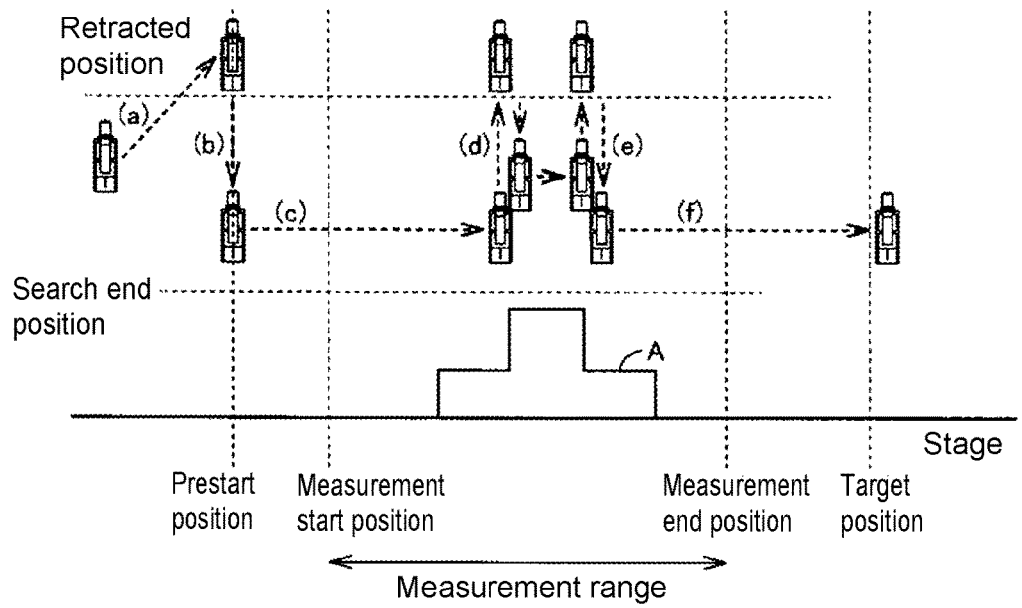
FIGS. 12A and 12B are diagrams illustrating the types of control performed in a control system according to one or more embodiments.
Figure 12B:
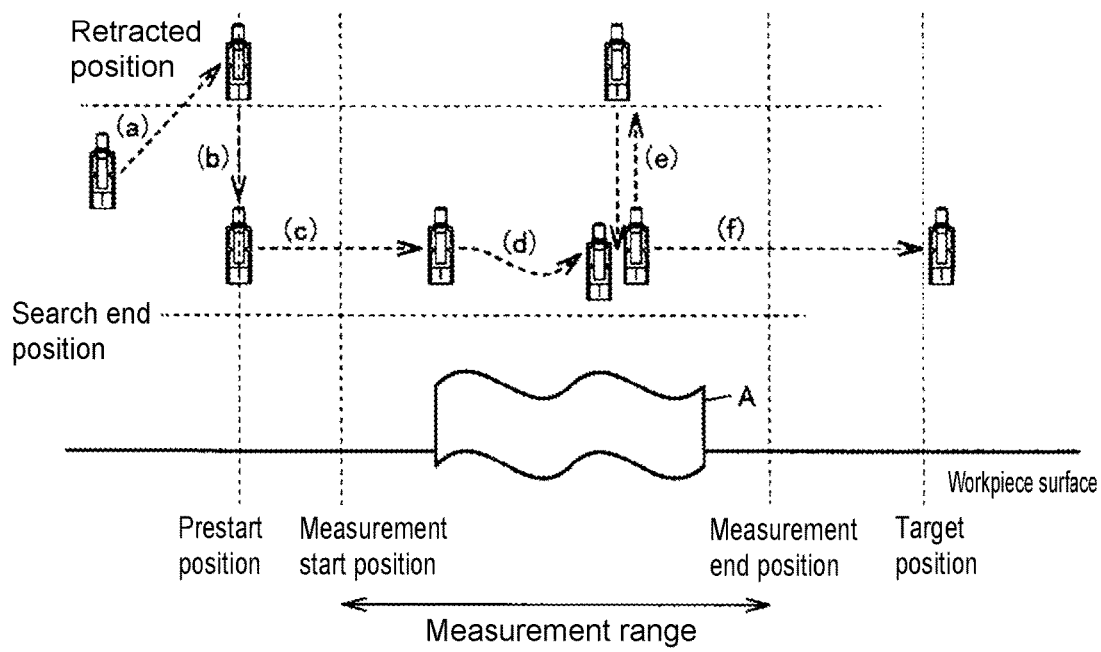

The surface search control and the trace control over the drives 30 and 40 for measuring the shape of the object A will now be described in more detail. FIGS. 12A and 12B are diagrams describing the types of control performed in the control system according to one or more embodiments.

G1. Surface Search Control

FIG. 12A shows the procedure for surface search control. In the surface search control, the PLC 1 first controls the drive 40 to move the displacement sensor 7 from the start position to the prestart position in X-direction and to a retracted position in Z-direction (control (a)). The prestart position and the retracted position are predetermined positions at which the object A is not in contact with the displacement sensor 7. The PLC 1 then moves the displacement sensor 7 in Z-direction for performing measurement positioning at the prestart position (control (b)). The measurement positioning control moves the displacement sensor 7 to a height at which the measurement information obtained by the displacement sensor 7 (information about the height of the object A) indicates 0 for the measurement surface (e.g., the top surface of the stage 31).

More specifically, the PLC 1 performs the measurement positioning control with the procedure below. First, (1) the PLC 1 starts moving the displacement sensor 7 toward a predetermined measurement end position. The measurement end position is set to a position where the displacement sensor 7 is not in contact with the object A. (2) When the displacement sensor 7 is ready for measuring the object (when the measurement surface of the object A enters the measurement range shown in FIG. 7), the PLC 1 moves the displacement sensor 7 to a height at which the measurement information indicates 0. (3) The PLC 1 stops the displacement sensor 7 at the height, where the measurement information indicates 0. (4) When the displacement sensor 7 is still not ready for measuring the object after the displacement sensor 7 reaches the measurement end position, the PLC 1 ends the control.

The PLC 1 then moves the displacement sensor 7 to target positions for measurement between the measurement start position and the measurement end position (control (c)). The PLC 1 may also move the displacement sensor 7 in a negative X-direction. However, the measurement range is to fall within the X-directional movable range of the drive 30. The PLC 1 obtains the position and height as line measurement data at each target position. When the PLC 1 detects an unmeasurable condition during measurement, the PLC 1 performs measurement positioning again (control (d) and control (e)). The factors for such unmeasurable conditions include the optical axis of the displacement sensor 7 being inclined largely (e.g., 25° or more), the object being out of the measurement range (e.g., 2 mm), and the displacement sensor 7 entering a false status based on unstable measurement information. The PLC 1 repeats measurement until the displacement sensor 7 reaches the measurement end position. When the displacement sensor 7 reaches the measurement end position, the measurement is complete (control (f)).

G2. Trace Control

Figure 13:
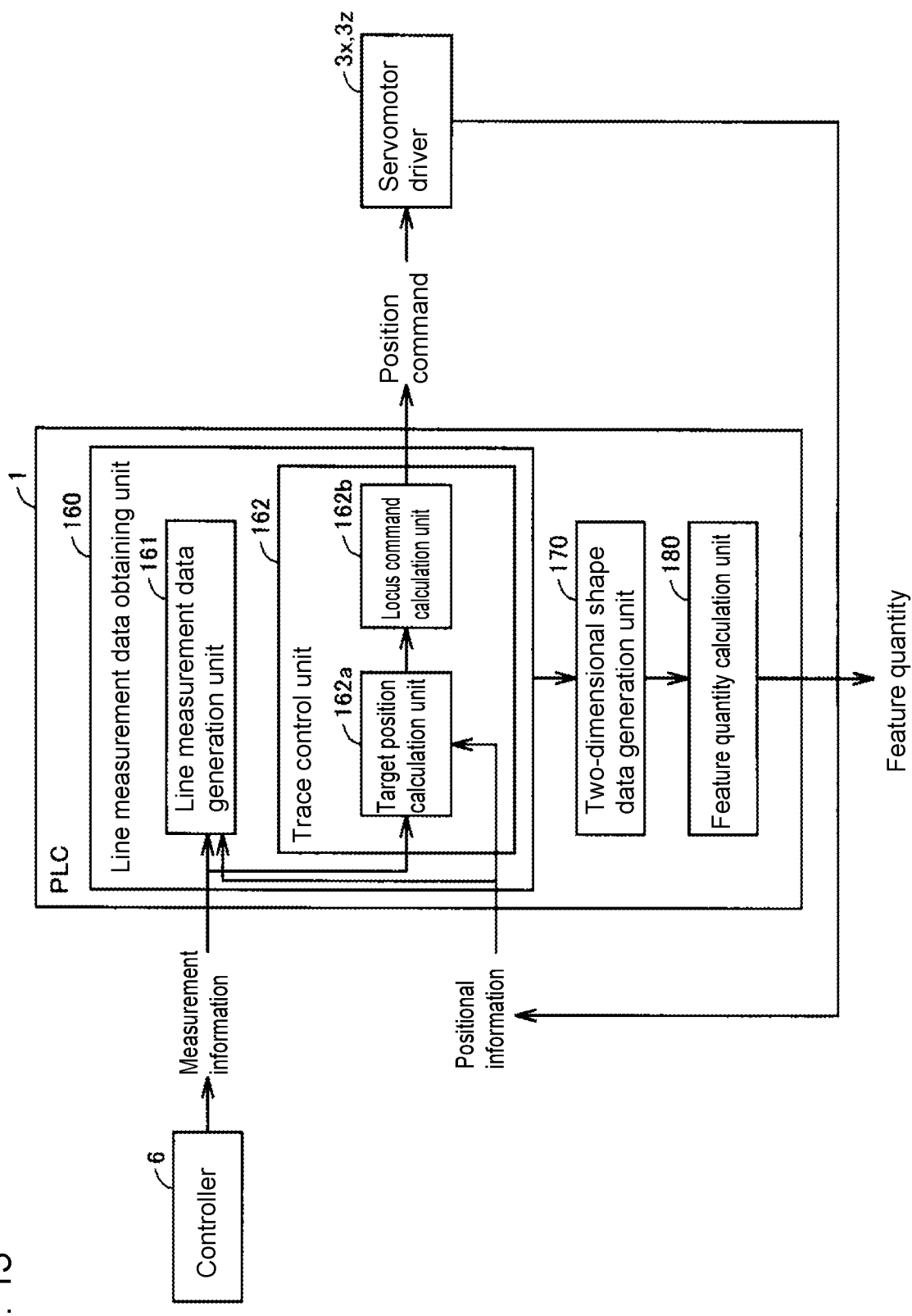
FIG. 13 is a functional block diagram illustrating a line measurement data obtaining unit in a control system according to one or more embodiments.

FIG. 12B shows the procedure for trace control. The trace control moves the displacement sensor 7 to cause the measurement information obtained by the displacement sensor 7 to constantly indicate 0. The PLC 1 includes a line measurement data obtaining unit including a trace control unit that performs trace control. FIG. 13 is a functional block diagram of the line measurement data obtaining unit included in the control system according to one or more embodiments. The line measurement data obtaining unit 160 includes a line measurement data generation unit 161 and a trace control unit 162. The line measurement data generation unit 161 generates line measurement data based on the measurement information obtained from the displacement sensor 7.

The trace control unit 162 includes a target position calculation unit 162a and a locus command calculation unit 162b. Based on the positional information about the displacement sensor 7 (or the positional information from the drive 40), the target position calculation unit 162a calculates target positions at which the measurement information obtained by the displacement sensor 7 constantly indicates 0. More specifically, when the measurement information obtained by the displacement sensor 7 indicates a value increasing by 1 mm, the target position calculation unit 162a generates a position command to lower the position of the displacement sensor 7 by 1 mm to offset the increase. In response to the position command generated by the target position calculation unit 162a, the trace control unit 162 controls the displacement sensor 7 to cause the measurement information to constantly indicate 0.

The locus command calculation unit 162b calculates a locus command that prevents the displacement sensor 7 from moving drastically in response to the position command generated by the target position calculation unit 162a. The locus command calculation unit 162b outputs, to the servomotor drivers 3x and 3z, the position command obtained by combining the position command generated by the target position calculation unit 162a with the calculated locus command. The trace control unit 162, which includes the locus command calculation unit 162b, reduces vibrations of the device by preventing the displacement sensor 7 from moving drastically.

Referring back to FIG. 12B, the PLC 1 controls the drive 40, also in the trace control, to move the displacement sensor 7 from the start position to the prestart position in X-direction and to a retracted position in Z-direction (control (a)).

The PLC 1 then moves the displacement sensor 7 in Z-direction for performing measurement positioning at the pre-start position (control (b)). The measurement positioning is the same control as the measurement positioning in the surface search control.

The PLC 1 then moves the displacement sensor 7 to target positions for measurement between the measurement start position and the measurement end position (control (c)). The PLC 1 may also move the displacement sensor 7 in a negative X-direction. However, the measurement range is to fall within the X-directional movable range of the drive 30. The PLC 1 changes the position of the displacement sensor 7 along the measurement surface of the object A while moving within the measurement range. While changing the position of the displacement sensor 7 in this manner, the PLC 1 obtains the position and height as line measurement data at each target position (control (d)). When the measurement information does not indicate 0, the PLC 1 moves the displacement sensor 7 by a distance that equates the difference between the position at which the measurement information does not indicate 0 and the zero position. When, for example, the measurement information indicates 1 mm, the PLC 1 raises the displacement sensor 7 by 1 mm. When the measurement information indicates −1 mm, the PLC 1 lowers the displacement sensor 7 by 1 mm.

When the PLC 1 detects an unmeasurable condition during measurement (or fails to obtain line measurement data), the PLC 1 moves the displacement sensor 7 to a retracted position (control (e)). The PLC 1 then performs measurement positioning again. As in the surface search control, the factors for such unmeasurable conditions include the optical axis of the displacement sensor 7 being inclined largely (e.g., 25° or more), the object being out of the measurement range (e.g., 2 mm), and the displacement sensor 7 entering a false status based on unstable measurement information. When the displacement sensor 7 enters the false status, the displacement sensor 7 transmits a false signal to the PLC 1. The PLC 1 receiving the false signal detects an unmeasurable condition during the measurement. The PLC 1 repeats measurement until the displacement sensor 7 reaches the measurement end position. When the displacement sensor 7 reaches the measurement end position, the measurement is complete (control (f)).

The data obtaining process is performed by the line measurement data obtaining unit 160 for each primary cyclic task. The data generation process by the 2D shape data generation unit 170 and the calculation process by the feature quantity calculation unit 180 are performed for each cyclic task. A cycle T1 used for each primary cyclic task is shorter than a cycle T2 used for each cyclic task. The data obtaining process thus has a higher priority than the data generation process and the calculation process. The determination process to determine whether the displacement sensor 7 is in a false status (whether an unmeasurable condition is detected in steps S2 and S16 in FIG. 14) may be performed by the PLC 1 for each primary cyclic task when the displacement sensor 7 is not in a false status. The determination process may also be performed before the data obtaining process for each primary cyclic task.

In this manner, the PLC system SYS according to one or more embodiments is a control system including the displacement sensor 7, the drives 30 and 40, and the PLC 1. In this system, multiple pieces of measurement information (1D information) are read from the displacement sensor 7 and multiple pieces of positional information are obtained from the drives 30 and 40 based on the measurement range and the measurement intervals (measurement recording positions) defined by the PLC 1 for measuring the object A. The PLC system SYS obtains these multiple pieces of information as line measurement data to generate 2D shape data. The PLC system SYS thus has high scalability in measuring the object A.

The line measurement data obtaining unit 160 combines the measurement information from the displacement sensor 7 with the positional information from the drive 40 (the position of the displacement sensor 7 in Z-direction) to obtain the line measurement data. This combination enables measurement of the height of the object A that exceeds the measurement range of the displacement sensor 7. The line measurement data obtaining unit 160 thus has high scalability in Z-direction.

The 2D shape data generation unit 170 corrects the measurement information from the displacement sensor 7 in accordance with the positions at the measurement intervals (measurement recording positions) to generate 2D shape data at regular measurement intervals. This reduces the data volume of 2D shape data.

The feature quantity calculation unit 180 calculates various feature quantities of the object A (e.g., the height and the cross-sectional area) using the 2D shape data generated by the 2D shape data generation unit 170.

The PLC 1, which functions as the master device, is connected with the network to the measurement device 20, the drives 30 and 40, and the remote IO terminal 5, which function as the slave devices. The PLC system SYS thus has high configuration flexibility.

H. Data Obtaining Process

Figure 14:
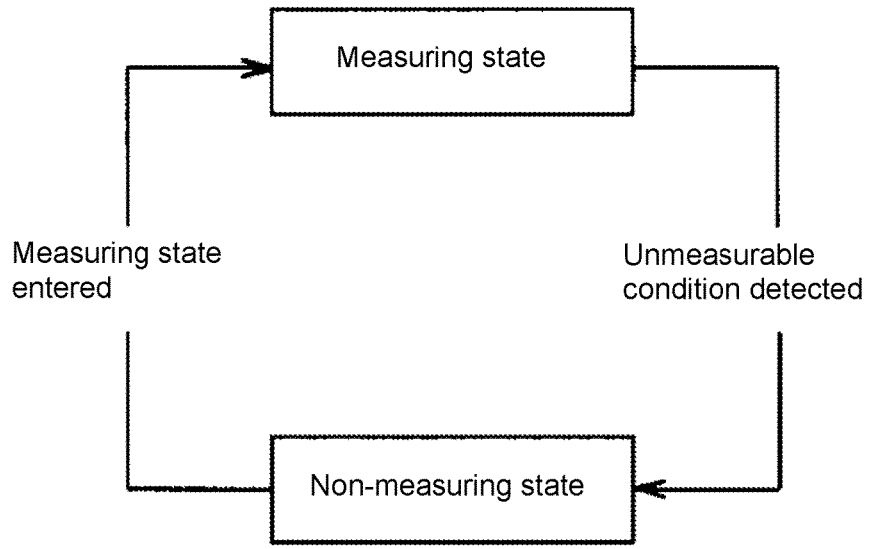
FIG. 14 is a diagram illustrating a measuring state and a non-measuring state.

The data obtaining process performed within the measurement range shown in FIG. 12B will now be described in detail. The measurement states of the displacement sensor 7 will now be described. FIG. 14 is a diagram describing the measurement states of the displacement sensor 7. The measurement states of the displacement sensor 7 include a measuring state and a non-measuring state. In the measuring state, the displacement sensor 7 can measure the height of the object A (1D information). In other words, the displacement sensor 7 is not in a false status. In the non-measuring state, the displacement sensor 7 cannot measure the height of the object A. The displacement sensor 7 is controlled to enter the non-measuring state when its false status is detected. In FIG. 14, the displacement sensor 7 is controlled to enter the measuring state when its non-measuring state is eliminated (e.g., when its false state is detected).

Figure 15:
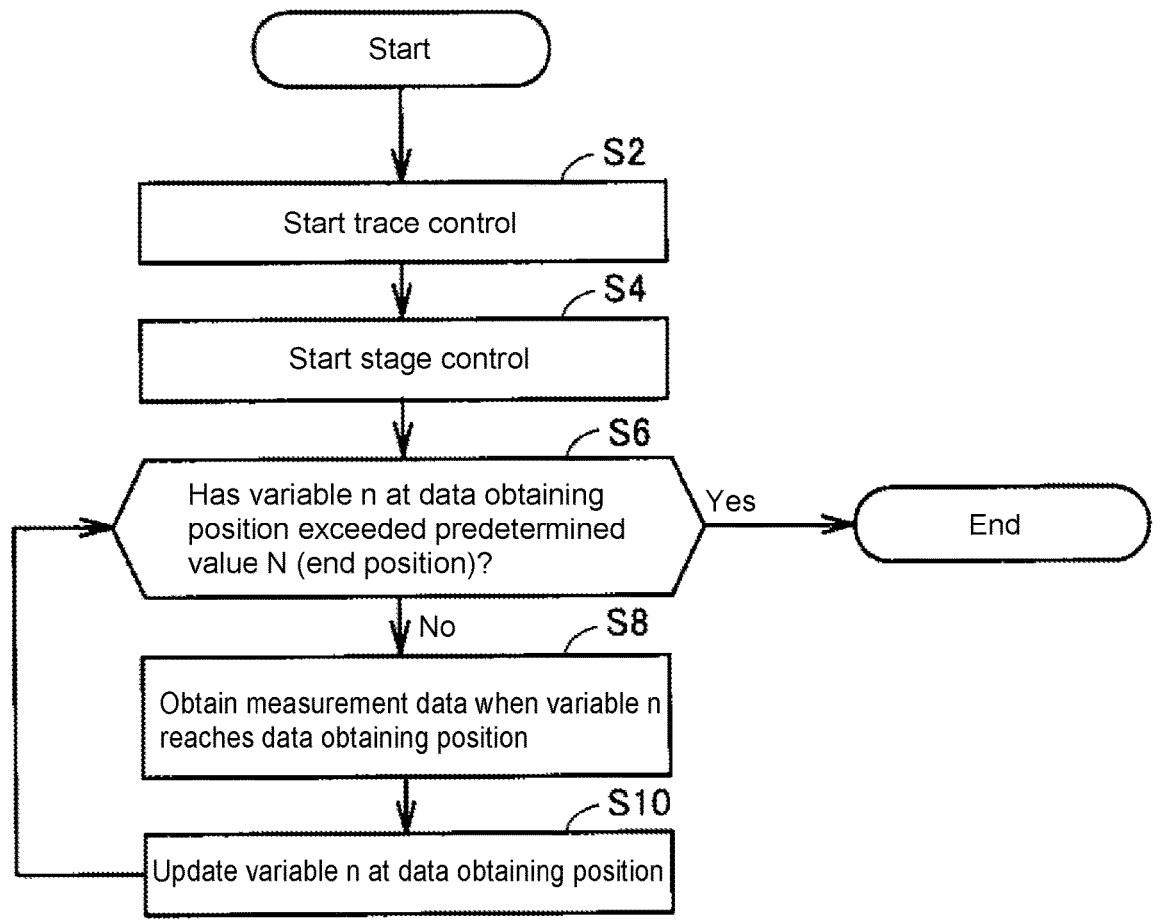
FIG. 15 is a flowchart illustrating a process performed in a measuring state.
Figure 16:
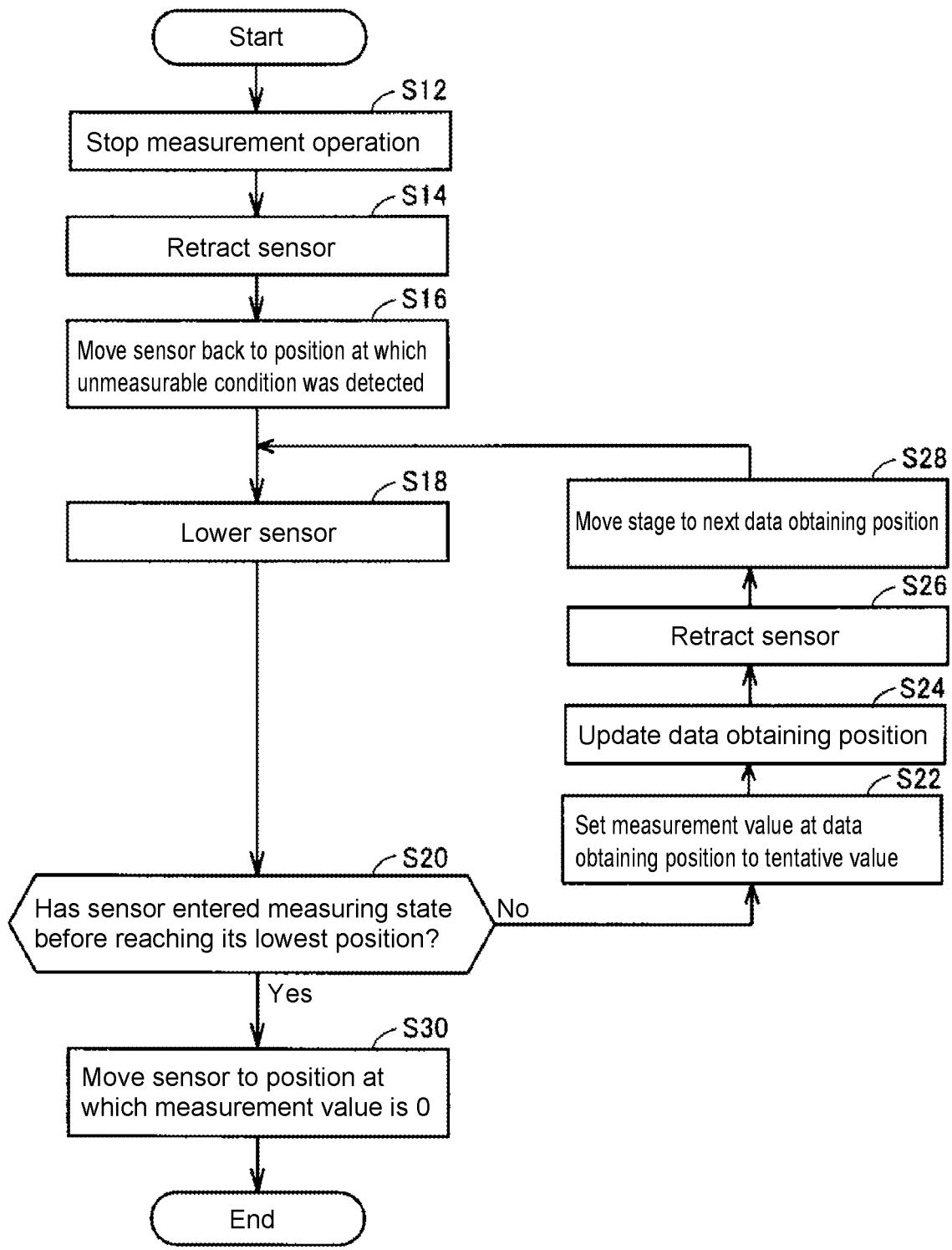
FIG. 16 is a flowchart illustrating a process performed in a non-measuring state.

In the measuring state, the determination process is performed to determine whether the object is unmeasurable, or whether the displacement sensor 7 is in a false status. The determination process is performed for every primary cyclic task in the measuring state. One or more embodiments describe separate processes using flowcharts, namely the measuring state process and the non-measuring state process. FIG. 15 is a flowchart showing the measuring state process. FIG. 16 is a flowchart showing the non-measuring state process.

The measuring state process will now be described with reference to the flowchart of FIG. 15. FIG. 15 is the flowchart showing the measuring state process. In step S2, the PLC 1 starts trace control. In step S4, the PLC 1 starts stage control. The stage control refers to controlling the drive 30 to move the stage 31 in X-direction toward the measurement end position (corresponding to the end position in step S6 in FIG. 15).

In the trace control, the PLC 1 performs measurement while moving the stage 31 in X-direction (S4), and increments the counter (variable n) for the data obtaining positions by 1 for each measurement recording position. The counter (variable n) for the data obtaining positions is incremented up to a predetermined value N (e.g., 20,000) that is determined depending on the measurement resolution. The position of the predetermined value N corresponds to the measurement end position shown in FIG. 8. The counter (variable n) for the data obtaining positions is stored into a predetermined storage area in the PLC 1. In step S6, the PLC 1 determines whether the counter (variable n) for the data obtaining positions exceeds the predetermined value N, namely, whether the current data obtaining position passes the measurement end position. When the determination result in step S6 is affirmative (Yes in S6), indicating that the PLC 1 has incremented the counter (variable n) for the data obtaining positions to the predetermined value N, the PLC 1 ends the data obtaining process for the object.

When the determination result is negative (No in S6) and the displacement sensor 7 reaches the data obtaining position corresponding to the incremented counter (variable n), the PLC 1 performs a measurement data obtaining process in which the line measurement data obtaining unit 160 reads, as measurement data, the measurement information from the displacement sensor 7 and the positional information from the drives 30 and 40 in step S8.

After the measurement data obtaining process in step S8, the PLC 1 increments the counter (variable n) for the data obtaining positions (S10). After incrementing the counter (variable n), the PLC 1 returns to the processing in step S6. Through the measuring state process shown in FIG. 15, the PLC 1 sequentially obtains measurement data without stopping the movement of the stage 31 for every measurement operation. The PLC 1 thus shortens the time taken to perform the data obtaining process for a single object, as compared with the control that stops the movement of the stage 31 for every measurement operation.

In parallel with the processing shown in FIG. 15, the PLC 1 also performs a determination process to determine whether an object is unmeasurable, or whether the displacement sensor 7 is in a false status (although not shown). While performing the processing in any step shown in FIG. 15, the PLC 1 can also determine whether an object is unmeasurable. The determination process is performed for each primary cyclic task.

When an object is determined unmeasurable in the determination process, the sensor is controlled to enter the non-measuring state, in which the non-measuring state process is performed. FIG. 16 is the flowchart showing the non-measuring state process. In step S12, the PLC 1 stops the measurement operation. Stopping the measurement operation includes both stopping the stage control and stopping the operation of the displacement sensor 7. Stopping the stage control refers to the PLC 1 controlling the drive 30 to stop moving the stage 31. This control stops the movement of the object A in X-direction. The operation of the displacement sensor 7 being stopped refers to the PLC 1 controlling the drive 40 to stop the operation of the displacement sensor 7. Stopping the measurement operation causes, for example, the processing to be started for both stopping the stage control and stopping the operation of the displacement sensor 7.

After the processing for stopping the measurement operation is complete, the PLC 1 raises the displacement sensor 7 to the retracted position in step S14 (refer also to control (e) in FIG. 12B). Raising the displacement sensor 7 equates to the PLC 1 controlling the drive 40 to raise the displacement sensor 7.

When the stage control is stopped in step S12, the X-directional position of the displacement sensor 7 can exceed (or can deviate from) the position at which the unmeasurable condition is detected. After the processing in step S14 is complete, the PLC 1 controls the stage 31 (or reverse the stage 31) in step S16 to align the X-directional position of the displacement sensor 7 with the data obtaining position at which the unmeasurable condition is detected. For example, when an unmeasurable condition is detected at the data obtaining position (e) in FIG. 8, the PLC 1 reverses the stage 31 to align the X-directional position of the displacement sensor 7 with the data obtaining position (e).

After the processing in step S16 is complete, the PLC 1 lowers the displacement sensor 7 in step S18. This process for lowering the displacement sensor 7 is the same as the measurement positioning process performed under the surface search control (refer to control (b) in FIG. 12A). In step S20, the PLC 1 determines whether the displacement sensor 7 enters a measuring state, or whether the displacement sensor 7 is not in a false status, during the sensor lowering period from when the processing in S18 is started to when the displacement sensor 7 reaches a predetermined position (e.g., its lowest position). This determination process is also performed for each primary cyclic task. More specifically, the determination process is performed for each primary cyclic task during the above sensor lowering period. In the non-measuring state in one or more embodiments, the determination process is not performed in any period other than the above sensor lowering period. In one modification, the PLC 1 may also perform the determination process in a period other than the sensor lowering period in the non-measuring state.

When the determination result in step S20 is negative (No), the processing advances to step S22. When the determination result is affirmative (Yes), the processing advances to step S30. In step S22, the line measurement data obtaining unit included in the PLC 1 sets (or obtains) the height of the object A (1D information) to a tentative value. The tentative value is the value ∞ as described with reference to in FIGS. 17A and 17B. In step S24, the PLC 1 updates the data obtaining position. The processing in S24 is the same as the processing in S10. In step S26, the PLC 1 raises the displacement sensor 7. The processing in S26 is the same as the processing in S14. In step S28, the PLC 1 then moves the stage 31 to the next data obtaining position. The processing in S28 is the same as the processing in S10. After the processing in S28 is complete, the processing returns to S18.

In step S30, the PLC 1 moves the displacement sensor 7 to the height at which the measurement information from the displacement sensor 7 indicates 0. This movement process is the same as the movement process in the surface search. After the moving process is complete, the processing returns to the measuring state process shown in FIG. 15.

In one or more embodiments, the processing shown in FIGS. 14 to 16 is performed under the trace control. The processing shown in FIGS. 14 to 16 may also be performed under other control.

An object having a rough surface or an object having an extremely high part will now be referred to as a particular-shaped object. In the examples shown in FIGS. 14 to 16, the PLC 1 performs the data obtaining process for obtaining line measurement data (or reading line measurement data in step S8 in FIG. 15) every time when the X-directional position of the displacement sensor 7 reaches the data obtaining position. When an unmeasurable condition is detected, the PLC 1 moves the displacement sensor 7 back to the unmeasurable data obtaining position (S16 in FIG. 16), and then performs the data obtaining process again (refer to S18 and S20 in FIG. 16). Thus, when a particular-shape object is determined to be unmeasurable, the PLC system SYS according to one or more embodiments performs measurement (data obtaining process) again for the unmeasurable part of the object. This minimizes the possibility that the shape of a particular-shape object is determined unmeasurable. This reduces limitations on objects for which shape measurement is to be performed.

When an unmeasurable condition is detected, the PLC 1 cannot determine the distance by which the displacement sensor 7 is to be moved in Z-direction. In this case, the PLC 1 may not perform trace control properly. As a result, the displacement sensor 7 can come in contact with the object. The PLC 1 according to one or more embodiments detects an unmeasurable condition and then retracts the displacement sensor 7 to the retracted position before controlling the stage (S14 and S26 in FIG. 16). This structure prevents the displacement sensor 7 from coming in contact with the object when an unmeasurable condition is detected.

When an unmeasurable condition is detected in the data obtaining process performed at a single data obtaining position, a PLC (hereafter, a comparative PLC) may repeat the data obtaining process at the data obtaining position until the unmeasurable condition is eliminated at the data obtaining position (or until the measurement data is obtained successfully). In contract, the PLC 1 according to one or more embodiments moves the stage 31 forward to the next data obtaining position (S28) and performs the data obtaining process (e.g., S20 and S30) when an unmeasurable condition is detected again in the repeated data obtaining process, as shown in steps S16, S18, and S20 (No in step S20). In this manner, when an unmeasurable condition is detected again in the repeated data obtaining process, the PLC according to one or more embodiments performs the data obtaining process at the next data obtaining position. This structure allows the line measurement data obtaining unit 160 to perform the data obtaining process more smoothly than the comparative PLC system.

Figure 17A:
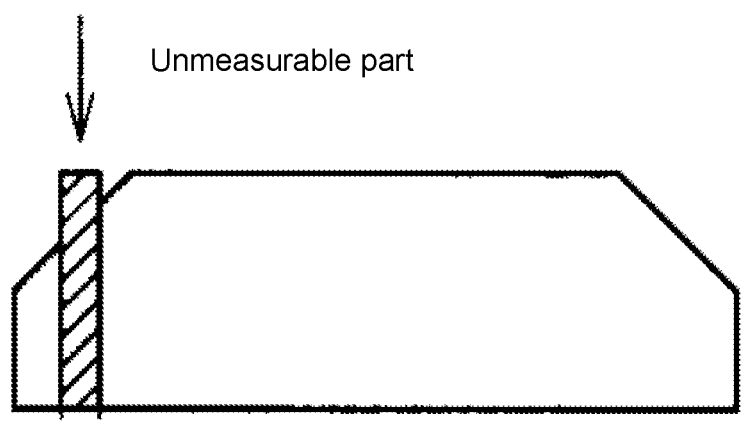
FIGS. 17A and 17B are diagrams illustrating shape data about an object having an unmeasurable part.
Figure 17B:
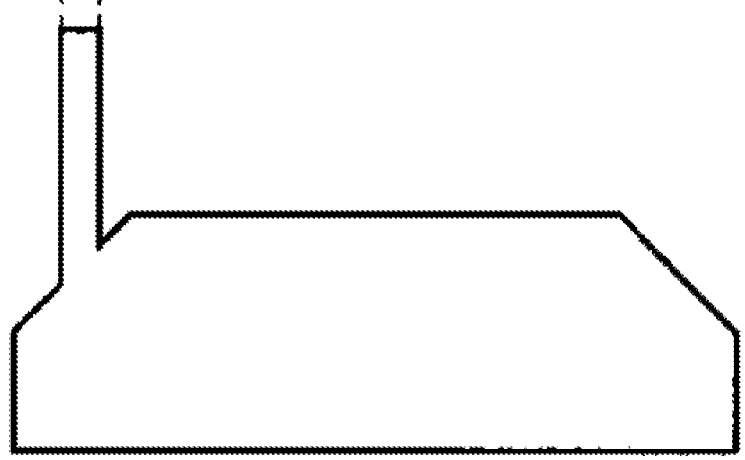

FIGS. 17A and 17B are diagrams describing an object having a part determined unmeasurable (a part corresponding to a data obtaining position for which an unmeasurable condition is detected). FIG. 17A shows the unmeasurable part, which is hatched. Information about the height of this unmeasurable part of the object A (1D information) differs from the 1D information obtained as the measurement data (1D information obtained when the data obtaining process is successful). In one or more embodiments, the information different from the 1D information obtained as the measurement data is, for example, the value ∞. This information is the tentative value described in step S22 in FIG. 16. As shown in FIG. 17B, the measurement data for an object having an unmeasurable part indicates the height of the markedly high unmeasurable part.

As described above, the height of the unmeasurable part of the object A (1D information) differs from the 1D information obtained as the measurement data. The 2D shape data generation unit 170 thus correctly identifies the unmeasurable part. The 2D shape data generation unit 170 also interpolates the unmeasurable part with the interpolation technique described with reference to FIG. 9. Although the information different from the 1D information obtained as the measurement data is the value ∞ in one or more embodiments, another value may also be used as this information.

Modifications (1) The PLC system SYS according to one or more embodiments changes the relative position of the displacement sensor 7 relative to the object A by causing the drive 30 to move the stage 31 in X-direction and causing the drive 40 to move the displacement sensor 7 in Z-direction. However, the embodiment is not limited to this structure. The PLC system SYS may change the relative position of the displacement sensor 7 relative to the object A by causing the drive 30 to move the stage 31 in both X-direction and Z-direction or by causing the drive 40 to move the displacement sensor 7 in both X-direction and Z-direction.

(2) The PLC system SYS according to one or more embodiments generates 2D shape data by causing the drive 30 to move the stage 31 in X-direction. However, the embodiment is not limited to this structure. The PLC system SYS may generate 3D shape data by causing the drive 30 to move the stage 31 in both X-direction and Y-direction. The PLC system SYS may also generate 3D shape data by causing the drive 30 to move the stage 31 in X-direction and causing the drive 40 to move the displacement sensor 7 in both Y-direction and Z-direction.

(3) The PLC system SYS according to one or more embodiments generates the 2D shape data using the single displacement sensor 7 included in the measurement device 20. However, the embodiment is not limited to this structure. The PLC system SYS may generate 2D shape data using multiple displacement sensors 7 included in the measurement device 20. The multiple displacement sensors 7 in the PLC system SYS allow line measurement data to be obtained promptly. This shortens the time taken to generate the 2D shape data.

(4) The PLC system SYS according to one or more embodiments includes the displacement sensor 7 that is a contactless white confocal displacement sensor. However, the PLC system SYS may include a contactless displacement sensor with another scheme, or a contact displacement sensor including a dial gauge or a differential transformer to produce the same advantageous effects.

(5) The PLC 1 (e.g., the line measurement data obtaining unit 160) may count the number of times the data obtaining process fails. When the counted number reaches a predetermined number P, the PLC 1 may perform error processing. The error processing includes stopping the control of the PLC 1 and notifying an error. Notifying an error includes, for example, transmitting information indicating an error to a predetermined display (e.g., the programmable display 300), and/or emitting a beep from a predetermined sound output unit (e.g., the speaker of the programmable display 300). The error processing notifies the user that the counted number of times the data obtaining process fails has reached the predetermined number P.

The counted number of times the data obtaining process fails may also be the number of times the data obtaining process performed by the line measurement data obtaining unit 160 fails for a single object. The predetermined number P may be a value determined in the manner described below. When the counted number of times the data obtaining process fails for a single object is P−1 or less, no error processing is performed. In this case, the 1D information about the positions at which the data obtaining process has failed is the value ∞, whereas proper linear data is generated for the positions at which the data obtaining process has succeeded. Although such linear data is generated, the predetermined number P may be set to allow the 2D shape data generation unit 170 to generate correct shape data.

The PLC system SYS according to one or more embodiments retries measurement once at the unmeasurable data obtaining position. The PLC system SYS may retry the measurement twice or more times. This structure minimizes the possibility that an unmeasurable condition is detected, as compared with when the measurement is retried once. In this structure, the predetermined number P may be the counted number of times the data obtaining process performed by the line measurement data obtaining unit 160 fails at a single data obtaining position.

(6) In the embodiments described above, the stage 31 is moved back to the data obtaining position at which an unmeasurable condition is detected after the displacement sensor 7 is retracted completely as shown in steps S14 and S16 in FIG. 16. In some embodiments, the stage 31 may be moved back to the data obtaining position at which an unmeasurable condition is detected while the displacement sensor is being retracted. For example, the processing for retracting the displacement sensor and the processing for moving the stage 31 back to the data obtaining position at which an unmeasurable condition is detected may be started at the same time. This structure shortens the time (e.g., the total time) of the data obtaining process performed for a single object by the line measurement data obtaining unit 160, as compared with when the processing for retracting the displacement sensor 7 is performed at different timing from the processing for moving the stage 31 back to the data obtaining position at which an unmeasurable condition is detected.

(7) In the embodiments described above, when an unmeasurable condition is detected at one data obtaining position, measurement is performed again at the detected data obtaining position as shown in FIG. 16. In some embodiments, when an unmeasurable condition is detected at one data obtaining position, no more measurement may be performed at this position, and measurement may be performed at the next data obtaining position. The processing for moving back the stage (S18 in FIG. 16) may be eliminated to reduce the processing load, and also shortens the processing time for generating linear data for a single object.

The embodiments disclosed herein should be considered to be in all respects illustrative and not restrictive. The scope of the invention is not defined by the embodiments described above but is defined by the appended claims, and all changes that come within the meaning and range of equivalency of the claims are intended to fall within the claims.

REFERENCE SIGNS LIST

1 PLC
2 field network
3x, 3z servomotor driver
4x, 4z servomotor
5 remote IO terminal
6 controller
7 displacement sensor
8 PLC support apparatus
10 connection cable
11 system bus
12 power supply unit
13 CPU
14, 53 IO unit
15 special unit
20 measurement device
30, 40 drive
31 stage
51 remote IO terminal bus
52 communication coupler
100 microprocessor
102 chipset
104 main memory
106 nonvolatile memory
160 line measurement data obtaining unit
161 line measurement data generation unit
162 trace control unit
162a target position calculation unit
162b locus command calculation unit
170 2D shape data generation unit
180 feature quantity calculation unit
230 control program
300 programmable display

The invention claimed is:

1. A control system, comprising:
a measurement device configured to obtain one-dimensional information about an object;
a drive configured to change a relative position of the measurement device relative to the object; and
a controller configured to control the measurement device and the drive to obtain information about a two-dimensional shape or a three-dimensional shape of the object based on the one-dimensional information obtained by the measurement device,
the controller comprising a processor configured with a program to perform operations comprising:
  operation as a measurement data obtaining unit configured to perform a data obtaining process for obtaining the one-dimensional information from the measurement device and positional information from the drive as measurement data while changing the relative position; and
  operation as a shape data generation unit configured to perform a data generation process for generating two-dimensional shape data or three-dimensional shape data based on the measurement data obtained by the measurement data obtaining unit,
wherein the processor is configured with the program such that:
  the measurement data obtaining unit performs the data obtaining process in response to the relative position changing to a data obtaining position that is in accordance with a defined measurement interval; and
  in response to the data obtaining process failing, after the measurement data obtaining unit retracts the measurement device to a position in a height direction of the object at which the measurement device is not in contact with the object, the measurement data obtaining unit changes the relative position along a breadth direction of the object back to the data obtaining position at which the data obtaining process has failed, and performs the data obtaining process again at the data obtaining position to which the relative position has been changed.

2. The control system according to claim 1, wherein the processor is configured with the program such that, in response to the data obtaining process being performed again and failing, the measurement data obtaining unit changes the relative position to a next data obtaining position, and performs the data obtaining process at the next data obtaining position.

3. The control system according to claim 2, wherein the one-dimensional information corresponding to the data obtaining position at which the data obtaining process has failed differs from the one-dimensional information obtained as the measurement data.

4. The control system according to claim 2, wherein the controller counts a number of times the data obtaining process fails, and in response to the counted number reaching a predetermined number, the controller performs error processing.

5. The control system according to claim 3, wherein the controller counts a number of times the data obtaining process fails, and in response to the counted number reaching a predetermined number, the controller performs error processing.

6. The control system according to claim 1, wherein the one-dimensional information corresponding to the data obtaining position at which the data obtaining process has failed differs from the one-dimensional information obtained as the measurement data.

7. The control system according to claim 6, wherein the controller counts a number of times the data obtaining process fails, and in response to the counted number reaching a predetermined number, the controller performs error processing.

8. The control system according to claim 1, wherein the controller counts a number of times the data obtaining process fails, and in response to the counted number reaching a predetermined number, the controller performs error processing.

9. The control system according to claim 1, wherein the processor is configured with the program to perform operations further comprising:
operation as a feature quantity calculation unit configured to calculate a feature quantity of the object based on the shape data generated by the shape data generation unit.

10. The control system according to claim 1, wherein the controller functioning as a master device and the measurement device and the drive functioning as slave devices are connected through a network.

11. A control method used by a controller for controlling a measurement device configured to obtain one-dimensional information about an object, and a drive configured to be controlled to change a relative position of the measurement device relative to the object to obtain information about a two-dimensional shape or a three-dimensional shape of the object based on the one-dimensional information obtained by the measurement device, the method comprising:
performing a data obtaining process for obtaining the one-dimensional information from the measurement device and positional information from the drive as measurement data while changing the relative position; and
performing a data generation process for generating two-dimensional shape data or three-dimensional shape data based on the measurement data, wherein:
performing the data obtaining process comprises performing the data obtaining process in response to the relative position changing to a data obtaining position that is in accordance with a defined measurement interval; and
performing the data obtaining process comprises, in response to the data obtaining process failing, after retracting the measurement device to a position in a height direction of the object at which the measurement device is not in contact with the object, changing the relative position along a breadth direction of the object back to the data obtaining position at which the data obtaining process has failed, and performing the data obtaining process again at the data obtaining position to which the relative position has been changed.

12. A non-transitory computer-readable recording medium storing a program for a controller that controls a measurement device configured to obtain one-dimensional information about an object, and a drive configured to be controlled to change a relative position of the measurement device relative to the object to obtain information about a two-dimensional shape or a three-dimensional shape of the object based on the one-dimensional information obtained by the measurement device, the program causing a processor included in the controller to perform operations comprising:
performing a data obtaining process for obtaining the one-dimensional information from the measurement device and positional information from the drive as measurement data while changing the relative position; and
performing a data generation process for generating two-dimensional shape data or three-dimensional shape data based on the measurement data, wherein:
performing the data obtaining process comprises performing the data obtaining process in response to the relative position changing to a data obtaining position that is in accordance with a defined measurement interval; and
performing the data obtaining process comprises, in response to the data obtaining process failing, after retracting the measurement device to a position in a height direction of the object at which the measurement device is not in contact with the object, changing the relative position along a breadth direction of the object back to the data obtaining position at which the data obtaining process has failed, and performing the data obtaining process again at the data obtaining position to which the relative position has been changed.

* * * * *